United States Patent
Toya

(10) Patent No.: US 9,997,934 B2
(45) Date of Patent: Jun. 12, 2018

(54) POWER STORAGE APPARATUS, METHOD FOR CONTROLLING STORAGE BATTERY, AND METHOD FOR CONTROL INFORMATION TERMINAL

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 216 days.

(21) Appl. No.: 15/065,934

(22) Filed: Mar. 10, 2016

(65) Prior Publication Data

US 2016/0294200 A1 Oct. 6, 2016

(30) Foreign Application Priority Data

Mar. 31, 2015 (JP) .................. 2015-070740

(51) Int. Cl.
*H02J 7/00* (2006.01)
*H02J 7/35* (2006.01)
*H02J 13/00* (2006.01)

(52) U.S. Cl.
CPC .......... *H02J 7/0029* (2013.01); *H02J 7/0047* (2013.01); *H02J 7/35* (2013.01); *H02J 13/0003* (2013.01); *Y02E 40/72* (2013.01); *Y04S 10/123* (2013.01)

(58) Field of Classification Search
CPC .................................................. H02J 7/0029
USPC ....................................... 320/107
See application file for complete search history.

(56) References Cited

U.S. PATENT DOCUMENTS

| 2012/0262093 | A1* | 10/2012 | Recker | H05B 33/0854 |
| | | | | 315/308 |
| 2013/0342131 | A1* | 12/2013 | Recker | H05B 33/0842 |
| | | | | 315/292 |
| 2016/0006085 | A1 | 1/2016 | Toya | |
| 2017/0111981 | A1* | 4/2017 | Recker | H05B 37/0272 |

FOREIGN PATENT DOCUMENTS

WO 2014/155903 10/2014

* cited by examiner

*Primary Examiner* — Suchin Parihar
(74) *Attorney, Agent, or Firm* — Greenblum & Bernstein, P.L.C.

(57) ABSTRACT

A power apparatus includes: a storage battery; a first communicator that communicates with external communication equipment through a short-range wireless communication; a power supply circuit that supply power of the storage battery to the electrical equipment; and a control circuitry that causes, when the first communicator receives a request signal for requesting at least one of first information regarding whether or not a power supply operation to supply the power of the storage battery to the electrical equipment through the power supply circuit is normal and second information regarding whether or not an operation of the electrical equipment using power supplied from the storage battery is normal from the external communication equipment, the first communicator to transmit response information including at least one of the first information and the second information to a transmission source of the request signal and to transmit the request signal to another power storage apparatus.

15 Claims, 22 Drawing Sheets

FIG. 5  251

| RESPONSE INFORMATION | | |
|---|---|---|
| APPARATUS RESPONSE INFORMATION | | |
| POWER STORAGE APPARATUS IDENTIFIER | POWER SUPPLY INFORMATION | EQUIPMENT OPERATION INFORMATION |
| ID001 | NORMAL | NORMAL |
| ID002 | ABNORMAL | NORMAL |
| ID003 | NORMAL | ABNORMAL |
| ⋮ | ⋮ | ⋮ |

252 (row ID001)

253   254   255

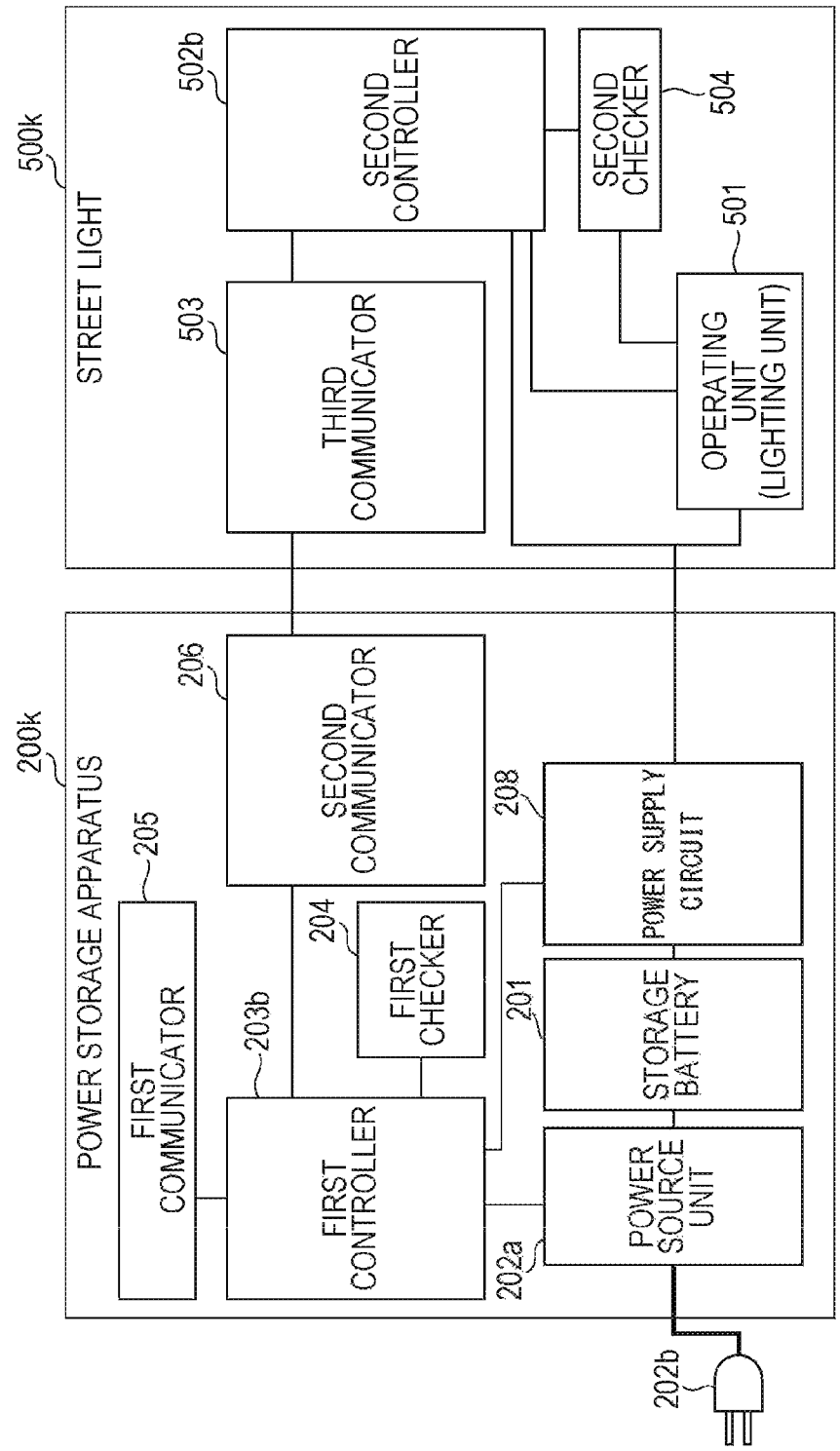

FIG. 20

| TEST NUMBER | TEST NAME | TEST CONDITION | OPERATION OF LIGHTING UNIT | OPERATION OF STORAGE BATTERY |
|---|---|---|---|---|
| 1 | DAYTIME TEST 1 | ILLUMINANCE SENSOR INDICATES DAYTIME LEVEL POWER SYSTEM IS PROPERLY SUPPLYING POWER | OFF | NO DISCHARGE |
| 2 | DAYTIME TEST 2 | ILLUMINANCE SENSOR INDICATES DAYTIME LEVEL THERE IS POWER FAILURE | OFF | NO DISCHARGE |
| 3 | DAYTIME TEST 3 | ILLUMINANCE SENSOR INDICATES DAYTIME LEVEL POWER IS RESTORED | OFF | NO DISCHARGE |
| 4 | NIGHTTIME TEST 1 | ILLUMINANCE SENSOR INDICATES NIGHTTIME LEVEL POWER SYSTEM IS PROPERLY SUPPLYING POWER | ON | NO DISCHARGE |
| 5 | NIGHTTIME TEST 2 | ILLUMINANCE SENSOR INDICATES NIGHTTIME LEVEL THERE IS POWER FAILURE | ON | DISCHARGE |
| 6 | NIGHTTIME TEST 3 | ILLUMINANCE SENSOR INDICATES NIGHTTIME LEVEL POWER IS RESTORED | ON | NO DISCHARGE |

POWER STORAGE APPARATUS, METHOD FOR CONTROLLING STORAGE BATTERY, AND METHOD FOR CONTROL INFORMATION TERMINAL

BACKGROUND

1. Technical Field

The present disclosure relates to a power storage apparatus provided for electrical equipment to supply power to the electrical equipment, and particularly relates to a technology for notifying a user of the state of power supply from the power storage apparatus to the electrical equipment.

2. Description of the Related Art

Power storage apparatuses are mounted on vehicles, such as power-assisted bicycles and electric vehicles, and are used to supply power thereto. The power storage apparatuses are also used to efficiently operate power-generating facilities, such as photovoltaic generators and fuel cells.

According to International Publication No. 2014/155903 (hereinafter referred to as Patent Document 1), a power storage apparatus is configured with a plurality of battery packs being incorporated therein. Each battery pack receives information indicating the remaining battery level and so on of another battery pack through a short-range wireless communication and further transmits the information to another battery pack. Through such an operation, the power storage apparatus can collect the remaining battery levels and so on of a plurality of battery packs.

As described above, according to Patent Document 1, the power storage apparatus configured with the plurality of battery packs can collect the remaining battery levels of the battery packs, but there is room for improvement.

SUMMARY

One non-limiting and exemplary embodiment provides a power storage apparatus that is capable of checking the state of power supply to electrical equipment.

In one general aspect, the techniques disclosed here feature a power storage apparatus provided for electrical equipment and including a storage battery. The power apparatus includes: a storage battery; a power supply circuit that supply power of the storage battery to the electrical equipment; a first communicator that communicates with external communication equipment through a short-range wireless communication; and control circuitry that causes, when the first communicator receives a request signal for requesting at least one of first information regarding whether or not a power supply operation to the power of the storage to the electrical equipment through the power supply circuit is normal and second information regarding whether or not an operation of the electrical equipment using power supplied from the storage battery is normal from the external communication equipment, the first communicator to transmit response information including at least one of the first information and the second information to a transmission source of the request signal and to transmit the request signal to another power storage apparatus.

According to the present disclosure, with respect to a power storage apparatus provided for electrical equipment, it is possible to check whether or not an operation of power supply from the power storage apparatus to electrical equipment is normal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates one example of the data structure of response information;

FIG. 19 is a block diagram illustrating the functional configuration of a street light and a power storage apparatus in a fifth modification;

FIG. 20 illustrates an operation-test-condition table for supplementary description;

DETAILED DESCRIPTION

According to the related art disclosed in Patent Document 1 described above, it is possible to obtain information regarding the states of the voltages, temperatures, and so on of storage battery packs not included in electrical equipment. However, no consideration has been given to checking whether or not the operation of power supply from the storage battery packs included in the electrical equipment to electrical equipment is normal.

Accordingly, the present inventor carried out extensive and earnest study and has conceived the followings.

That is, one aspect of the present disclosure provides a power storage apparatus provided for electrical equipment. The power apparatus includes: a storage battery; a power supply circuit that supply power of the storage battery to the electrical equipment; a first communicator that communicates with external communication equipment through a short-range wireless communication; and control circuitry that causes, when the first communicator receives a request signal for requesting at least one of first information regarding whether or not a power supply operation to supply the power of the storage battery to the electrical equipment through the power supply circuit is normal and second information regarding whether or not an operation of the electrical equipment using power supplied from the storage battery is normal from the external communication equipment, the first communicator to transmit response information including at least one of the first information and the second information to a transmission source of the request signal and to transmit the request signal to another power storage apparatus.

With this arrangement, with respect to a plurality of power storage apparatuses provided for electrical equipment, it is possible to check the state of power supply from each power storage apparatus to the electrical equipment.

A power storage apparatus and an information-terminal controlling method according to one aspect of the present disclosure will be specifically described below with reference to the accompanying drawings.

Embodiments described below all represent specific examples of the present disclosure. Numerical values, shapes, materials, constituent elements, the arrangement positions and connections of constituent elements, steps, and an order of steps described in the embodiments below are merely examples and are not intended to limit the present disclosure. Of the constituent elements in the embodiments below, constituent elements not set forth in the independent claims representing the broadest concept will be described as optional constituent elements.

First Embodiment

Now, a description will be given of an inspection system 10 according to a first embodiment of the present disclosure.

Figure 1:
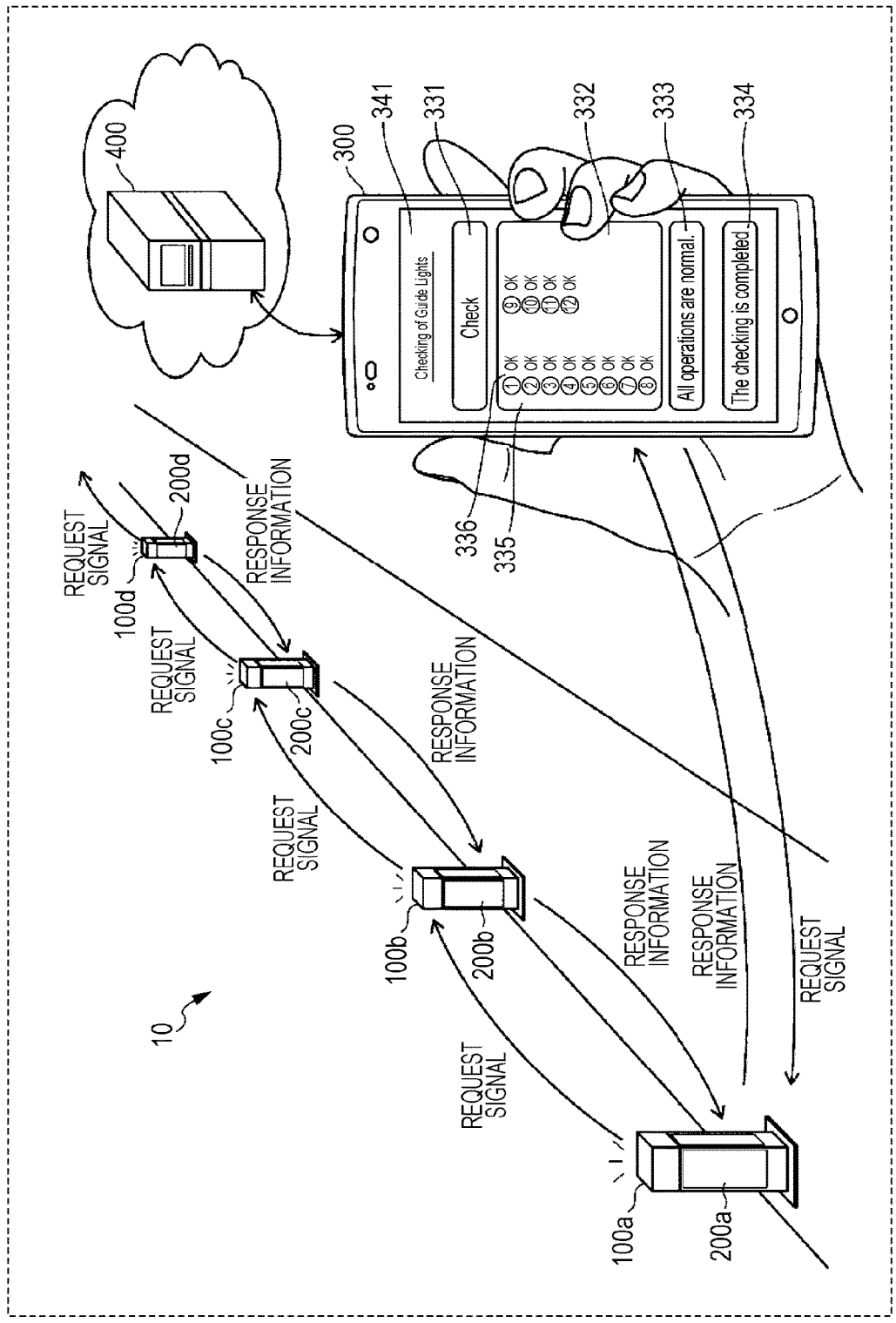
FIG. 1 is a system block diagram illustrating the configuration of an inspection system according to a first embodiment.

FIG. 1 is a system block diagram illustrating the configuration of the inspection system 10.

As illustrated in FIG. 1, the inspection system 10 includes guide lights 100a, 100b, 100c, 100d, . . . , an information terminal 300, and a server apparatus 400.

The guide lights 100a, 100b, 100c, 100d, . . . are installed on a road in one line in this order at predetermined intervals.

A power storage apparatus 200a is connected to the guide light 100a. The guide light 100a operates using power supplied from the power storage apparatus 200a. The power storage apparatus 200a outputs DC power. The guide light 100a may be a DC type light or an AC type light. In case the guide light 100a may be a DC type light, the DC power from the power storage apparatus 200a is converted to AC power via a DC/AC converter provided with the guide light 100a.

The guide light 100a includes an operating unit 103 that operates using power supplied from the power storage apparatus 200a, and when the operating unit 103 operates, a main function of electrical equipment (e.g., the guide light 100a) is realized. The operating unit 103 is, for example, a lighting unit and may be implemented by a light-emitting diode (LED). The lighting unit emits light by using power supplied from the power storage apparatus 200a. The guide lights 100b, 100c, 100d, . . . are configured similarly to the guide light 100a, and power storage apparatuses 200b, 200c, 200d, . . . are connected to the guide lights 100b, 100c, 100d, . . . , respectively. Thus, since the guide lights 100a, 100b, 100c, 100d, . . . illuminate the road, pedestrians can walk with feelings of security even in the nighttime. The guide lights are one example of electrical equipment in the present disclosure.

There is a possibility that an abnormality occurs in the power supply from the power storage apparatus to each guide light or a failure occurs in the guide light (e.g., the operating unit 103 in the guide light). In this case, an inspector of the inspection system 10 performs inspection in the following manner.

An inspector who holds the information terminal 300 stands in the range of wireless communication with the power storage apparatus 200a for the guide light 100a. The inspector operates the information terminal 300 to transmit, through a short-range wireless communication, a request signal for requesting information regarding whether or not a power supply operation that the power storage apparatus performs on the corresponding guide light is normal.

Upon receiving the request signal from the information terminal 300 through the short-range wireless communication, the power storage apparatus 200a for the guide light 100a transmits the same request signal through a short-range wireless communication. Next, upon receiving the request signal from the power storage apparatus 200a for the guide light 100a through the short-range wireless communication, the power storage apparatus 200b for the guide light 100b transmits the same request signal through a short-range wireless communication. Next, upon receiving the request signal from the power storage apparatus 200b for the guide light 100b through the short-range wireless communication, the power storage apparatus 200c for the guide light 100c transmits the same request signal through a short-range wireless communication.

As described above, the request signal transmitted from the information terminal 300 is relayed from the power storage apparatus for one guide light to the power storage apparatus for another guide light adjacent thereto.

Upon receiving the request signal from the information terminal 300 through the short-range wireless communication, the power storage apparatus 200a for the guide light 100a generates response information including information regarding whether or not the power supply operation that the power storage apparatus 200a performs on the guide light 100a is normal. Next, the power storage apparatus 200a for the guide light 100a transmits the generated response information through a short-range wireless communication. The information terminal 300 receives the response information, generated by the power storage apparatus 200a for the guide light 100a, through the short-range wireless communication.

Also, upon receiving the request signal from the power storage apparatus 200a for the guide light 100a through the short-range wireless communication, the power storage apparatus 200b for the guide light 100b generates response information including information regarding whether or not the power supply operation that the power storage apparatus 200b performs on the guide light 100b is normal. Next, the power storage apparatus 200b for the guide light 100b transmits the generated response information through a short-range wireless communication. The power storage apparatus 200a for the guide light 100a receives the response information from the power storage apparatus 200b for the guide light 100b through the short-range wireless communication. Upon receiving the response information, the power storage apparatus 200a for the guide light 100a transmits the response information, received from the power storage apparatus 200b for the guide light 100b, through a short-range wireless communication. The information terminal 300 receives the response information, generated by the power storage apparatus 200b for the guide light 100b, via the power storage apparatus 200a for the guide light 100a through the short-range wireless communication.

In addition, upon receiving the request signal from the power storage apparatus 200b for the guide light 100b through the short-range wireless communication, the power storage apparatus 200c for the guide light 100c generates response information including information regarding whether or not the power supply operation that the power storage apparatus 200c performs on the guide light 100c is normal. Next, the power storage apparatus 200c for the guide light 100c transmits the generated response information through a short-range wireless communication. The power storage apparatus 200b for the guide light 100b receives the response information from the power storage apparatus 200c for the guide light 100c through the short-range wireless communication. Upon receiving the response information, the power storage apparatus 200b for the guide light 100b transmits the response information, received from the power storage apparatus 200c for the guide light 100c, through a short-range wireless communication. Upon receiving the response information, the power storage apparatus 200a for the guide light 100a transmits the response information, received from the power storage apparatus 200b for the guide light 100b, through a short-range wireless communication. The information terminal 300 receives the response information, generated by the power storage apparatus 200c for the guide light 100c, via the power storage apparatus 200a for the guide light 100a through the short-range wireless communication.

As described above, the power storage apparatus provided for each guide light directly transmits the response information including information regarding whether or not the power supply operation performed by the power storage apparatus is normal to the information terminal 300 or transmits the response information to the information terminal 300 via the power storage apparatus(es) provided for the guide light(s) located between the power storage apparatus and the information terminal 300.

The information terminal 300 collects the response information from the power storage apparatuses 200a, 200b, 200c, 200d, . . . for the respective guide lights 100a, 100b, 100c, 100d, . . . . Based on the collected response information, the information regarding whether or not the power supply operation for each guide light is normal is displayed on a display surface of the information terminal 300.

For example, the information terminal 300 and the server apparatus 400 are connected to each other through a mobile phone network and the Internet.

Figure 2:
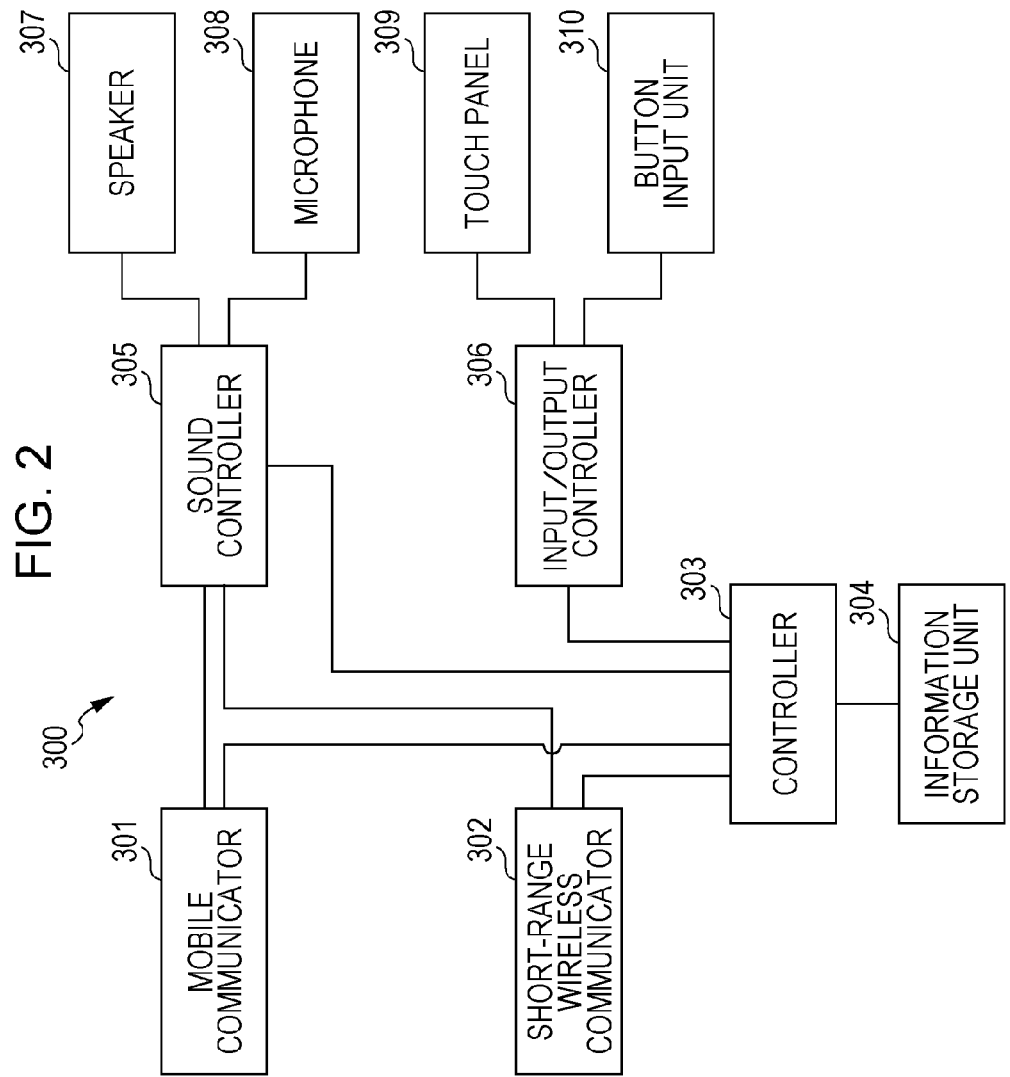
FIG. 2 is a block diagram illustrating the functional configuration of an information terminal.

Under the control of a controller 303 (illustrated in FIG. 2), the information terminal 300 transmits the response information, collected from the power storage apparatuses for the guide lights, to the server apparatus 400 via a mobile communicator 301 (illustrated in FIG. 2). The information terminal 300 may transmit the collected response information to the server apparatus 400 at an arbitrary timing. More specifically, the information terminal 300 may transmit, upon collecting the response information in a state in which there is no instruction from the user of the information terminal 300, the response information to the server apparatus 400 under the control of the controller 303 or may periodically transmit the collected response information to the server apparatus 400. Also, after receiving an instruction from the user of the information terminal 300, the information terminal 300 may transmit the collected response information to the server apparatus 400 under the control of the controller 303.

The server apparatus 400 receives the response information, collected from the power storage apparatuses for the guide lights, from the information terminal 300 and stores the received response information. The server apparatus 400 may be a cloud server apparatus. The cloud server apparatus in this case provides a variety of services to users through a network, such as the Internet.

In the first embodiment, the direction from the information terminal 300 to the guide light 100a, the direction from the guide light 100a to the guide light 100b, the direction from the guide light 100b to the guide light 100c, and the direction from the guide light 100c to the guide light 100d are referred to as a "downstream direction (or downstream side)". That is, the downstream direction is a direction in which the request signal is transmitted. On the other hand, the direction from the guide light 100d to the guide light 100c, the direction from the guide light 100c to the guide light 100b, the direction from the guide light 100b to the guide light 100a, and the direction from the guide light 100a to the information terminal 300 are referred to as an "upstream direction (or upstream side)". That is, the upstream direction is a direction in which the response information is transmitted.

In accordance with an operation performed by the user, the information terminal 300 transmits, through a short-range wireless communication, the request signal for requesting information regarding whether or not the power supply operation that the power storage apparatus performs on the guide light is normal. The information terminal 300 also receives, through a short-range wireless communication, the response information including the information regarding whether or not the power supply operation that the power storage apparatus performs on the guide light is normal. In addition, the information terminal 300 displays, on the display surface, the information regarding whether or not the power supply operation performed by the power storage apparatus, the information being included in the received response information, is normal.

In other words, the information terminal 300 operates in accordance with a control method involving steps a to c below:

(Step a) transmitting, to the power storage apparatus, a request signal for requesting information regarding whether or not the power supply operation that the power storage apparatus performs on the electrical equipment is normal;

(Step b) obtaining response information including the information regarding whether or not the power supply operation performed by the power storage apparatus is normal, the information being transmitted by the power storage apparatus in response to the request signal; and (Step c) displaying the information regarding whether or not the power supply operation performed by the power storage apparatus is normal, the information being included in the response information, on the display screen of the information terminal 300.

In this case, the response information may include information regarding whether or not the power supply operations performed by a plurality of power storage apparatuses are normal. In this case, in step (c), the information regarding whether or not the power supply operations performed by the respective power storage apparatuses are normal is displayed in a tabular form on a summary screen 341 of the information terminal 300.

FIG. 2 is a block diagram illustrating the functional configuration of the information terminal 300.

The information terminal 300 includes, for example, the mobile communicator 301, a short-range wireless communicator 302, the controller 303, an information storage unit 304, a sound controller 305, an input/output controller 306, a speaker 307, a microphone 308, a touch panel 309, and a button input unit 310, as illustrated in FIG. 2.

The information terminal 300 is, specifically, a computer system including a microprocessor, a signal processor, a read-only memory (ROM), a random-access memory (RAM), and so on. A computer program is stored in the RAM. The microprocessor and the signal processor operate in accordance with the computer program. With this configuration, the mobile communicator 301, the short-range wireless communicator 302, the controller 303, the sound controller 305, and the input/output controller 306 realize functions thereof.

The information terminal 300 is, for example, a smartphone. The information terminal 300 may be a tablet computer, a mobile phone, a personal computer, or the like.

The information storage unit 304 includes, for example, a nonvolatile semiconductor memory.

The information storage unit 304 has an area for storing one or more pieces of received response information.

The mobile communicator 301 realizes a mobile communication, for example, based on a standard, such as Code Division Multiple Access (CDMA) 2000 or Long Term Evolution (LTE).

The short-range wireless communicator 302 performs a short-range wireless communication, for example, based on a standard, such as IEEE 802.15.1 (Bluetooth®). Signals transmitted from the short-range wireless communicator 302 have no directivity and are thus radiated omnidirectionally therefrom. The short-range wireless communicator 302 may perform communication through a short-range wireless, based on a short-range wireless communication standard specified by ZigBee.

In the microphone 308, a coil vibrates in a magnetic field in conjunction with a diaphragm that vibrates in response to an acoustic wave, so that sound signals, which are analog electrical signals, are generated.

The speaker 307 receives sound signals, which are analog electrical signals, from the sound controller 305, and a diaphragm in the speaker 307 vibrates in accordance with the received sound signals to output an acoustic wave.

The sound controller 305 decodes encoded sound information, converts the decoded sound information into analog electrical signals, and outputs the analog electrical signals to the speaker 307. Upon receiving sound signals from the microphone 308, the sound controller 305 converts the sound signals into digital electrical signals, and outputs encoded sound information to the mobile communicator 301.

The touch panel 309 has a display panel unit having a rectangular display surface and a touch pad unit attached to the display surface. The display panel unit is, for example, a liquid-crystal display. The touch pad unit detects a contact of a manipulator, such as a user's finger, with an operation surface of the touch panel 309.

Under the control of the controller 303, the touch panel 309 displays, for example, the summary screen 341 via the input/output controller 306. As illustrated in FIG. 1, the summary screen 341 includes a check area 331, a table 332, and messages 333 and 334.

The check area 331 receives a touch operation performed by the user. When a touch operation is performed on the check area 331, the touch panel 309 outputs, to the controller 303 via the input/output controller 306, a checking start instruction for starting checking the states of the power supply operations of the power storage apparatuses 200a, 200b, 200c, 200d, . . . for the guide lights 100a, 100b, 100c, 100d, . . . . The checking may include not only checking the states of the power supply operations performed by the power storage apparatuses but also checking the states of operations of the guide lights using power supplied from the power storage apparatuses. The checking start instruction is one example of a request signal in the present disclosure.

The table 332 indicates whether or not the power supply operations performed by the power storage apparatuses 200a, 200b, 200c, 200d, . . . are normal with respect to the respective guide lights 100a, 100b, 100c, 100d, . . . . When the checking include not only checking the states of the power supply operations performed by the power storage apparatuses but also checking the states of the operations of the guide lights, both results may be displayed together or may be displayed individually. In this example, information 335 corresponds to identification information of the guide light, and information 336 corresponds to the information regarding whether or not the power supply operation performed by the power storage apparatus is normal.

The message 333 indicates whether the power supply operations performed by the power storage apparatuses 200a, 200b, 200c, 200d, . . . are normal with respect to all of the guide lights 100a, 100b, 100c, 100d, . . . or whether or not the power supply operations performed by the power storage apparatuses are not normal with respect to some of the guide lights 100a, 100b, 100c, 100d, . . . .

The message 334 indicates that the checking of the power supply operations performed by the power storage apparatuses 200a, 200b, 200c, 200d, . . . for the guide lights 100a, 100b, 100c, 100d, . . . is completed.

The button input unit 310 has a plurality of buttons. The user operates each button by pressing it.

The input/output controller 306 relays information between the button input unit 310 and the controller 303 and information between the touch panel 309 and the controller 303.

The controller 303 controls the mobile communicator 301, the short-range wireless communicator 302, the information storage unit 304, the sound controller 305, and the input/output controller 306.

Also, the controller 303 receives a checking start instruction from the touch panel 309 via the input/output controller 306. Upon receiving the checking start instruction, the controller 303 generates a request signal for requesting information regarding whether or not the power supply operation that the power storage apparatus performs on the guide light is normal. Next, the controller 303 outputs the generated request information to the short-range wireless communicator 302 to cause it to transmit the request information.

Also, the controller 303 receives response information from the guide light 100a via the short-range wireless communicator 302. Upon receiving the response information, the controller 303 writes the received response information to the information storage unit 304. Next, the controller 303 reads the response information from the information storage unit 304 and uses the read response information to generate a table to be displayed on the touch panel 309. The table includes numbers for identifying the respective guide lights 100a, 100b, 100c, 100d, . . . and results of checking of the operations of the guide lights 100a, 100b, 100c, 100d, . . . , the numbers and the results being associated with each other. The controller 303 outputs the generated table to the touch panel 309 via the input/output controller 306.

The controller 303 may be any controller having a control function and includes a computational processing unit (not illustrated) and a storage unit (not illustrated) in which a control program is stored. Examples of the computational processing unit include a micro processing unit (MPU) and a central processing unit (CPU). One example of the storage unit is a memory. The controller 303 may be implemented by a single controller that performs centralized control or may be configured by a plurality of controllers that perform distributed control in cooperation with each other.

Figure 22:
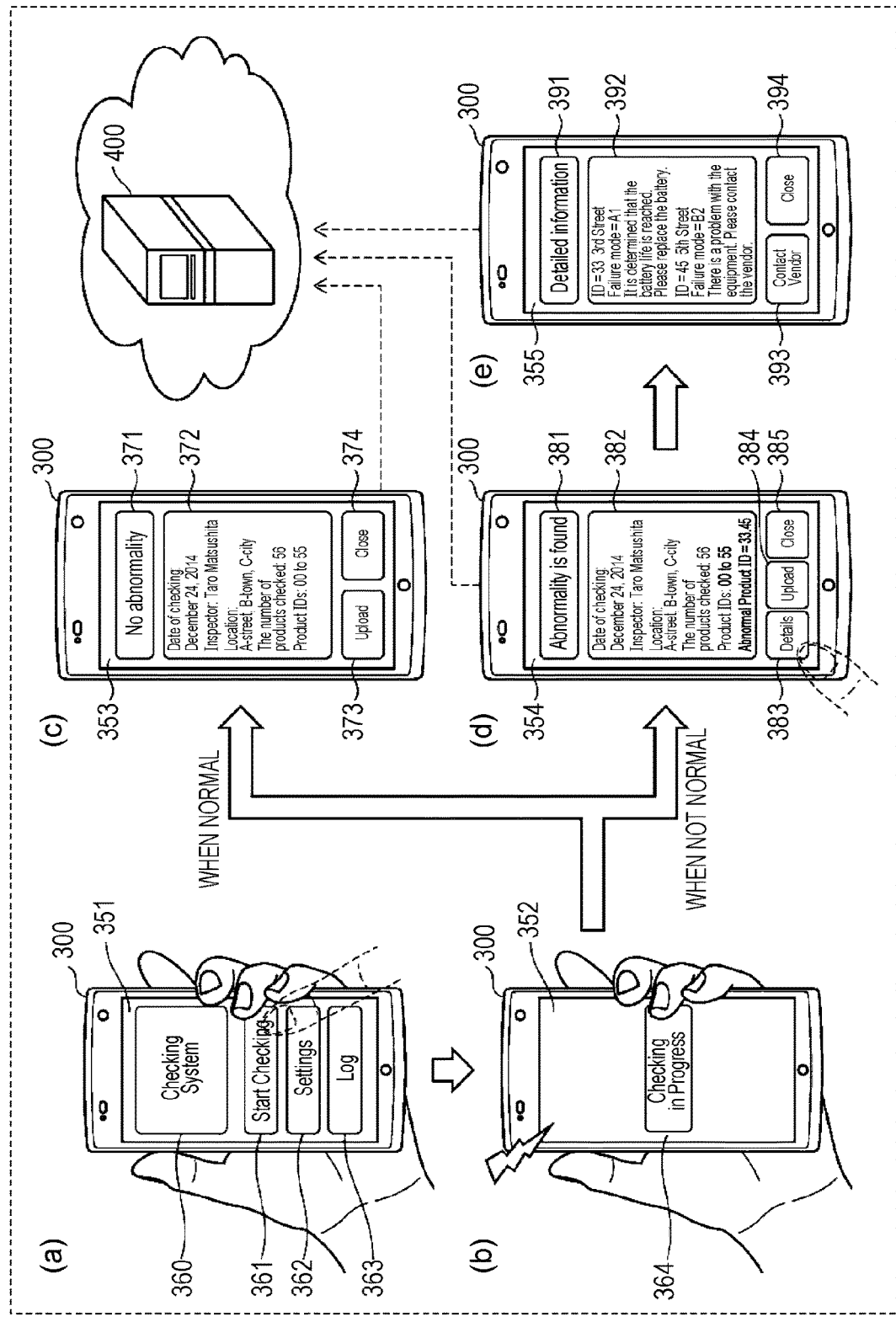
FIG. 22 illustrates transitions on a screen displayed on a touch panel.

Transitions of a screen displayed on the touch panel 309 will be now described with reference to FIG. 22. FIGS. 22(a) to 22(e) illustrate examples of transitions of a screen displayed on the touch panel 309.

In the examples, the touch panel 309 displays screens 351, 352, 353, 354, and 355 illustrated in FIGS. 22(a), 22(b), 22(c), 22(d), and 22(e), respectively.

When the information terminal 300 executes a checking system, which is an application program for collecting the statuses of the power supply operations of the power storage apparatuses 200a, 200b, 200c, 200d, . . . for the guide lights 100a, 100b, 100c, 100d, . . . , the screen 351 illustrated in FIG. 22(a) is displayed on the touch panel 309.

As illustrated in FIG. 22(a), the screen 351 includes a title 360, a button 361, a button 362, and a button 363. The title 360, the button 361, the button 362, and the button 363 display "checking system", "start checking", "settings", and "log", respectively.

When the user operates the button 361, collection of the statuses of the power supply operations of the power storage apparatuses 200a, 200b, 200c, 200d, . . . for the guide lights 100a, 100b, 100c, 100d, . . . is started, and the screen 352 illustrated in FIG. 22(b) is displayed. When the user operates the button 362, a screen for setting conditions for collecting the statuses of the power supply operations of the power storage apparatuses 200a, 200b, 200c, 200d, . . . for the guide lights 100a, 100b, 100c, 100d, . . . is displayed. When the user operates the button 363, history is displayed.

The screen 352 includes a title 364. "Checking in progress" is displayed as the title 364. This indicates that the statuses of the power supply operations of the power storage apparatuses 200a, 200b, 200c, 200d, . . . for the guide lights 100a, 100b, 100c, 100d, . . . are being collected.

When the collection of the statuses of the power supply operations of the power storage apparatuses 200a, 200b, 200c, 200d, . . . for the guide lights 100a, 100b, 100c, 100d, . . . is finished, the screen 353 illustrated in FIG. 22(c) or the screen 354 illustrated in FIG. 22(d) is displayed. The screen 353 is displayed when the checking results of all the guide lights indicate that the power supply operations are normal, and the screen 354 is displayed when the checking result of any of the guide lights indicates that the power supply operation is not normal.

The screen 353 includes a checking result 371, checking details 372, a button 373, and a button 374. The checking result 371, the button 373, and the button 374 show "no abnormality", "upload", and "close", respectively. The checking details 372 show details of the checking. The details of the checking include the date of checking, an inspector, the location of the checking, the number of products checked, the identifiers of the products checked, and so on.

When the user operates the button 373, the collected response information is transmitted to the server apparatus 400. When the user operates the button 374, the screen 351 is displayed instead of the screen 353.

The screen 354 includes a checking result 381, checking details 382, a button 383, a button 384, and a button 385. The checking result 381, the button 383, the button 384, and the button 385 show "abnormality is found", "details", "upload", and "close", respectively. The checking details 382 show details of checking. The details of checking include the date of checking, the inspector, the location of the checking, the number of products checked, the identifiers of the products checked, the identifiers of products from which abnormalities were detected, and so on.

When the user operates the button 383, the screen 355 illustrated in FIG. 22(e) is displayed. When the user operates the button 384, the collected response information is transmitted to the server apparatus 400. When the user operates the button 385, the screen 351 is displayed instead of the screen 354.

The screen 355 includes a title 391, checking details 392, a button 393, and a button 394. The title 391, the button 393, and the button 394 show "detailed information", "contact vendor", and "close", respectively. The checking details 392 include the identifiers of products from which abnormalities were detected, the locations where the products are installed, the states of the abnormalities, and so on.

When the user operates the button 393, the detailed information is reported to a vendor. When the user operates the button 394, the screen 351 is displayed instead of the screen 355.

The guide lights 100a, 100b, 100c, 100d, . . . have substantially the same structure. The guide lights 100a, 100b, 100c, 100d, . . . are referred to as "guide lights 100" in the following description. The power storage apparatuses 200a, 200b, 200c, 200d, . . . have substantially the same structure. The power storage apparatuses 200a, 200b, 200c, 200d, . . . are referred to as "power storage apparatuses 200" in the following description.

The power storage apparatus 200 is connected to each guide light 100. The guide light 100 is turned on with power supplied from the power storage apparatus 200.

The power storage apparatus 200 communicates with the information terminal 300 (which is external communication equipment) or the power storage apparatus 200 (which is external communication equipment) for another guide light 100 through a short-range wireless communication. The power storage apparatus 200 receives, from the external communication equipment, a request signal for requesting information regarding whether or not the power supply operation that the power storage apparatus 200 performs on the guide light is normal. Upon receiving the request signal, the power storage apparatus 200 transmits response information including the information regarding whether or not the power supply operation is normal to the transmission source of the request signal. The power storage apparatus 200 also transmits the request signal to another power storage apparatus 200.

Figure 3:
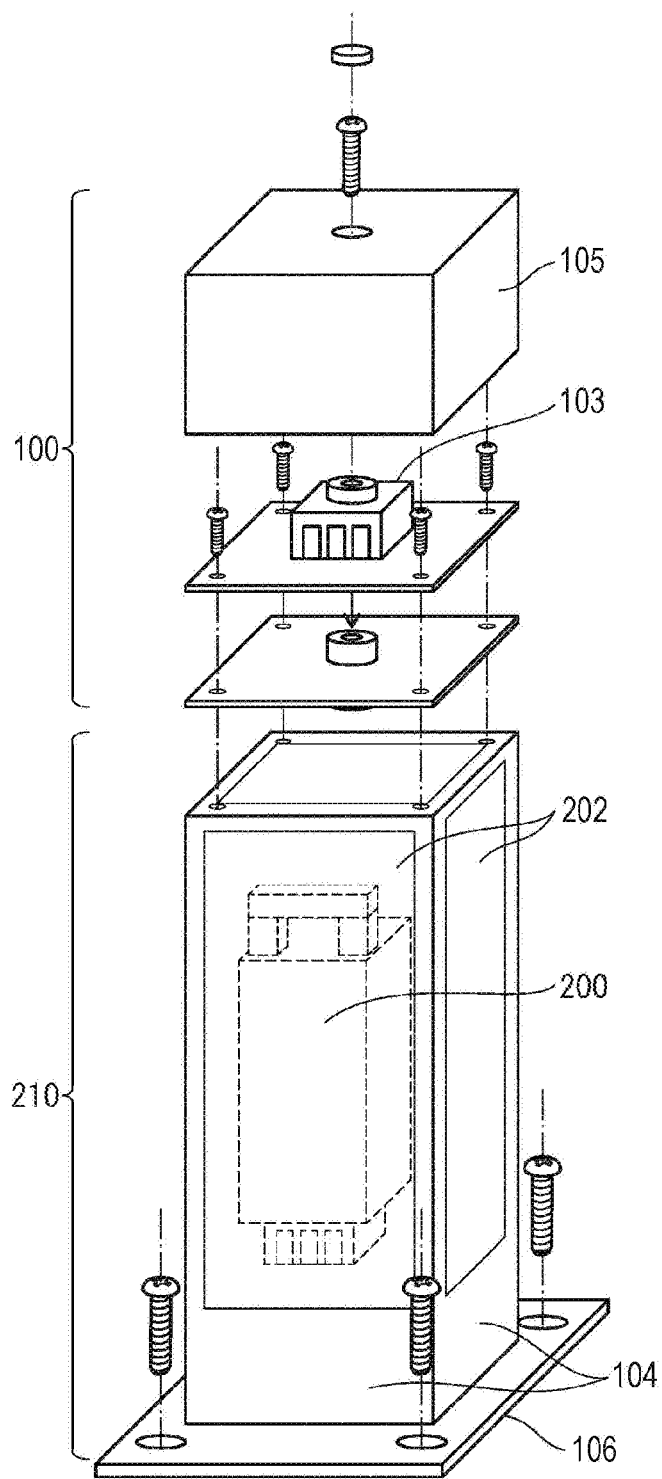
FIG. 3 is an exploded perspective view of a guide light and a power storage apparatus.
Figure 4:
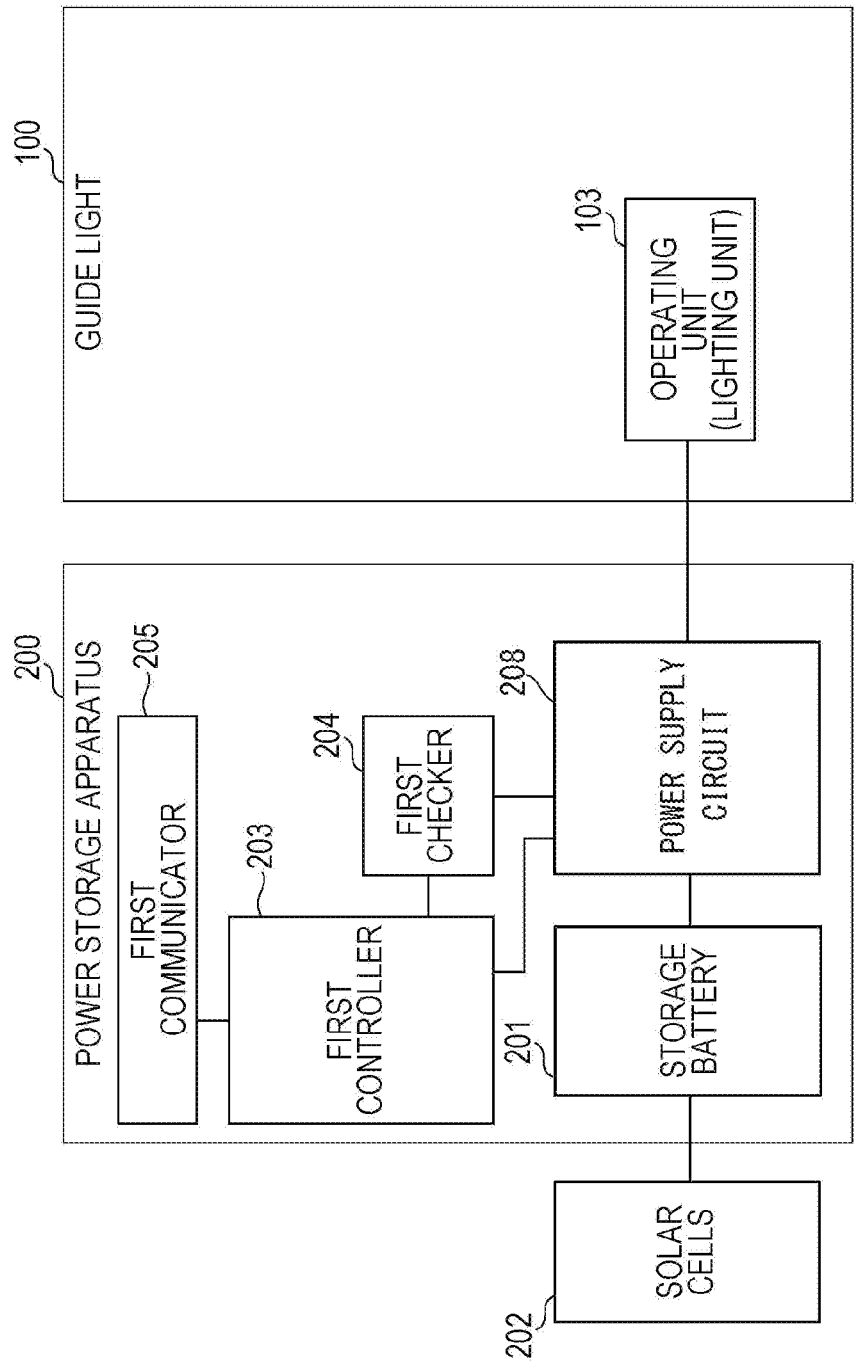
FIG. 4 is a block diagram illustrating the functional configuration of the guide light and the power storage apparatus.

FIG. 3 is an exploded perspective view of the guide light 100 and the power supply apparatus 210. FIG. 4 is a block diagram illustrating the functional configuration of the guide light 100 and the power storage apparatus 200.

As illustrated in FIG. 3, the power supply apparatus 210 is mounted on an upper surface of a mounting base 106 in a fixed condition, and the guide light 100, which includes the operating unit (the lighting unit) 103, is removably mounted on an upper portion of the power supply apparatus 210.

The power supply apparatus 210 has a structure in which a storage battery apparatus 200 is accommodated in a cuboid formed by combining four elongated exterior plates 104 and solar cells (solar panels) 202 formed in an elongated manner are fixed to respective exterior surfaces of the exterior plates 104.

The operating unit 103 is enclosed by a translucent cover member 105. The cover member 105 allows light radiated by the lighting unit to be transmitted therethrough and also protects the lighting unit from the external environment.

As illustrated in FIG. 4, the power storage apparatus 200 includes the storage battery 201, the solar cells 202, a first controller 203, a first checker 204, a first communicator 205, and a power supply circuit 208.

The power storage apparatus 200 may detachably connect to the power supply apparatus 210 via a connector, not shown, of the power storage apparatus 200. In this case, the power storage apparatus 200 may be said to detachably connect to the guide light 100 via the connector.

The power storage apparatus 200 holds therein a power storage apparatus identifier for uniquely identifying it.

The storage battery 201 is a rechargeable chemical battery, which can store electricity through charging and can be repeatedly used. The storage battery 201 may be a cell, a storage battery block including a plurality of cells assembled, or a storage battery module including a plurality of storage battery blocks assembled.

The storage battery 201 is charged upon receiving power from the solar cells 202.

The DC power is supplied from the storage battery 201 to the guide light 100 through the power supply circuit 208. The power supply circuit 208 includes a power supply switch (e.g., a field-effect transistor (FET)). Under the control of the first controller 203, the power supply switch is set to an on or off state.

When the power supply switch is set to the on state, the storage battery 201 supplies power to the operating unit 103 in the guide light 100. Upon supply of the power, the operating unit 103 starts operating. When the power supply switch is set to the off state, the storage battery 201 stops supplying power to the operating unit 103 in the guide light 100. The power supply circuit 208 may include a DC/DC converter a DC voltage of the storage battery 201 to a different DC voltage.

The solar cells 202 are panels for generating power by using the sunlight or the like and may also be called photovoltaic panels. The solar cells 202 supply the generated power to the storage battery 201.

The first controller 203 has a storage unit (not illustrated) in which a computer program for control is stored and a computational processing unit (not illustrated). A processor operates in accordance with the computer program for control, so that the first controller 203 realizes its functions. Examples of the computational processing unit include an MPU and a CPU. One example of the storage unit is a memory. The first controller 203 may be implemented by a single controller that performs centralized control or may be configured by a plurality of controllers that perform distributed control in cooperation with each other.

The first controller 203 reads a power storage apparatus identifier held in the power storage apparatus 200.

The first controller 203 receives, from the first communicator 205, a request signal for requesting information regarding whether or not the power supply operation that the power storage apparatus 200 performs on the guide light 100 is normal. The first controller 203 may also receive response information from the first communicator 205 (this response information is hereinafter referred to as "response information from the downstream side"). In this case, the request signal is transmitted by the communication equipment at the upstream side. Also, the response information from the downstream side is transmitted by the power storage apparatus 200 at the downstream side.

Upon receiving the request signal, the first controller 203 executes a checking program for checking whether or not the power supply operation that the power storage apparatus 200 performs on the guide light 100 is normal. The checking program states a command to be executed by the first controller 203 when the request signal is received. In this example, the checking program also checks whether or not the operation of the guide light 100 is normal.

Upon starting the execution of the checking program, the first controller 203 turns on the power supply switch (FET) included in the power supply circuit 208.

The first controller 203 receives power supply information, which is a checking result indicating whether or not power is properly supplied from the storage battery 201 to the guide light 100, and equipment operation information, which is a checking result indicating whether or not the guide light 100 is operating properly, from the first checker 204. An abnormality of the storage battery 201, an abnormality of the power supply circuit 208, or the like are exemplified as factors contributing to not normally supplying power from the storage battery to the guide light 100. An abnormality of the operating unit 103, or the like are exemplified as factors contributing to not normally operating of the guide light 100.

Upon receiving the power supply information and the equipment operation information, the first controller 203 generates apparatus response information including the read power storage apparatus identifier, the power supply information, and the equipment operation information. Next, the first controller 203 generates response information (which is hereinafter referred to as "local response information") including the generated apparatus response information.

In this and subsequent examples, when the power storage apparatus 200 receives, from the external communication equipment (the information terminal 300 or another power storage apparatus 200), a request signal for requesting information regarding whether or not the power supply operation that the power storage apparatus 200 performs on the guide light 100 is normal, the first controller 203 generates apparatus response information including the power supply information and the equipment operation information, but the present disclosure is not limited thereto. When the power storage apparatus 200 receives a request signal for requesting the information regarding whether or not the power supply operation that the power storage apparatus 200 performs on the guide light 100 is normal and information regarding whether or not the operation of the guide light 100 is normal, the first controller 203 may generate apparatus response information including the power supply information and the equipment operation information.

Also, upon receiving the response information from the downstream power storage apparatus 200 (i.e., the response information of the downstream side), the first controller 203 extracts one or more pieces of apparatus response information from the received response information of the downstream side. Each piece of apparatus response information includes the corresponding power storage apparatus identifier, the power supply information, and the equipment operation information. After extracting the one or more pieces of apparatus response information, the first controller 203 adds the extracted apparatus response information to the generated local response information.

FIG. 5 illustrates one example of the data structure of response information 251. As illustrated in FIG. 5, the response information 251 includes one or more pieces of apparatus response information. Each piece of apparatus response information includes a power storage apparatus identifier, power supply information, and equipment operation information. The power storage apparatus identifier is identification information for identifying the power storage apparatus 200. The power supply information is a checking result indicating whether or not power is properly supplied from the storage battery 201 to the guide light 100. The equipment operation information is a checking result indicating whether or not the guide light 100 is operating properly.

As one example, the response information 251 includes apparatus response information 252, as illustrated in FIG. 5. The apparatus response information 252 includes a power storage apparatus identifier 253 "ID001", power supply information 254 "normal", and equipment operation information 255 "normal".

Upon generating the response information, the first controller 203 outputs the generated response information to the first communicator 205 and causes it to transmit the response information.

Upon receiving the request signal for requesting the information regarding whether or not the power supply operation that the power storage apparatus 200 performs on the guide light 100 is normal, the first controller 203 outputs the received request signal to the first communicator 205 and causes it to transmit the request signal.

The first checker 204 has at least one of a current sensor and a voltage sensor.

When the first controller 203 starts executing the checking program, the first checker 204 checks whether or not power is properly supplied from the storage battery 201 to the guide light 100, based on at least one of an electrical current detected by the current sensor and a voltage detected by the voltage sensor. The first checker 204 outputs the power supply information, which is a checking result indicating whether or not power is properly supplied, to the first controller 203. The first checker 204 also estimates whether or not the guide light 100 is operating properly, based on at least one of the electrical current detected by the current sensor and the voltage detected by the voltage sensor. Thus, the first checker 204 can check whether or not the guide light 100 is operating properly. The first checker 204 outputs the equipment operation information, which is a checking result indicating whether or not the guide light 100 is operating properly, to the first controller 203.

As one example, the first communicator 205 performs a short-range wireless communication, based on the IEEE 802.15.1 (Bluetooth®) standard. The first communicator 205 may also perform a short-range wireless communication, based on the short-range wireless communication standard specified by ZigBee.

The first communicator 205 receives the request signal and the response information (the response information of the downstream side). Upon receiving the request signal and the response information of the downstream side, the first communicator 205 outputs the received request signal and response information of the downstream side to the first controller 203. In this case, the request signal is transmitted by the communication equipment at the upstream side. The response information of the downstream side is transmitted by the power storage apparatus at the downstream side.

The first communicator 205 also receives, from the first controller 203, the request signal for requesting the information regarding whether or not the power supply operation that the power storage apparatus 200 performs on the guide light 100 is normal. Upon receiving the request signal, the first communicator 205 transmits the received request signal.

Signals transmitted from the first communicator 205 have no directivity and are thus radiated omnidirectionally therefrom.

The server apparatus 400 receives the response information, collected from the power storage apparatuses 200 for the guide lights 100, from the information terminal 300 and stores the received response information.

The server apparatus 400 includes a controller, a communicator, and an information storage unit.

The server apparatus 400 is, specifically, a computer system including a microprocessor, a ROM, a RAM, a hard disk device, a communication unit, and so on. A computer program is stored in the hard disk device or the RAM. The microprocessor operates in accordance with the computer program. With this configuration, the controller realizes its functions.

The controller receives the response information from the information terminal 300 via the communicator. The controller writes the received response information to the information storage unit.

Figure 6:
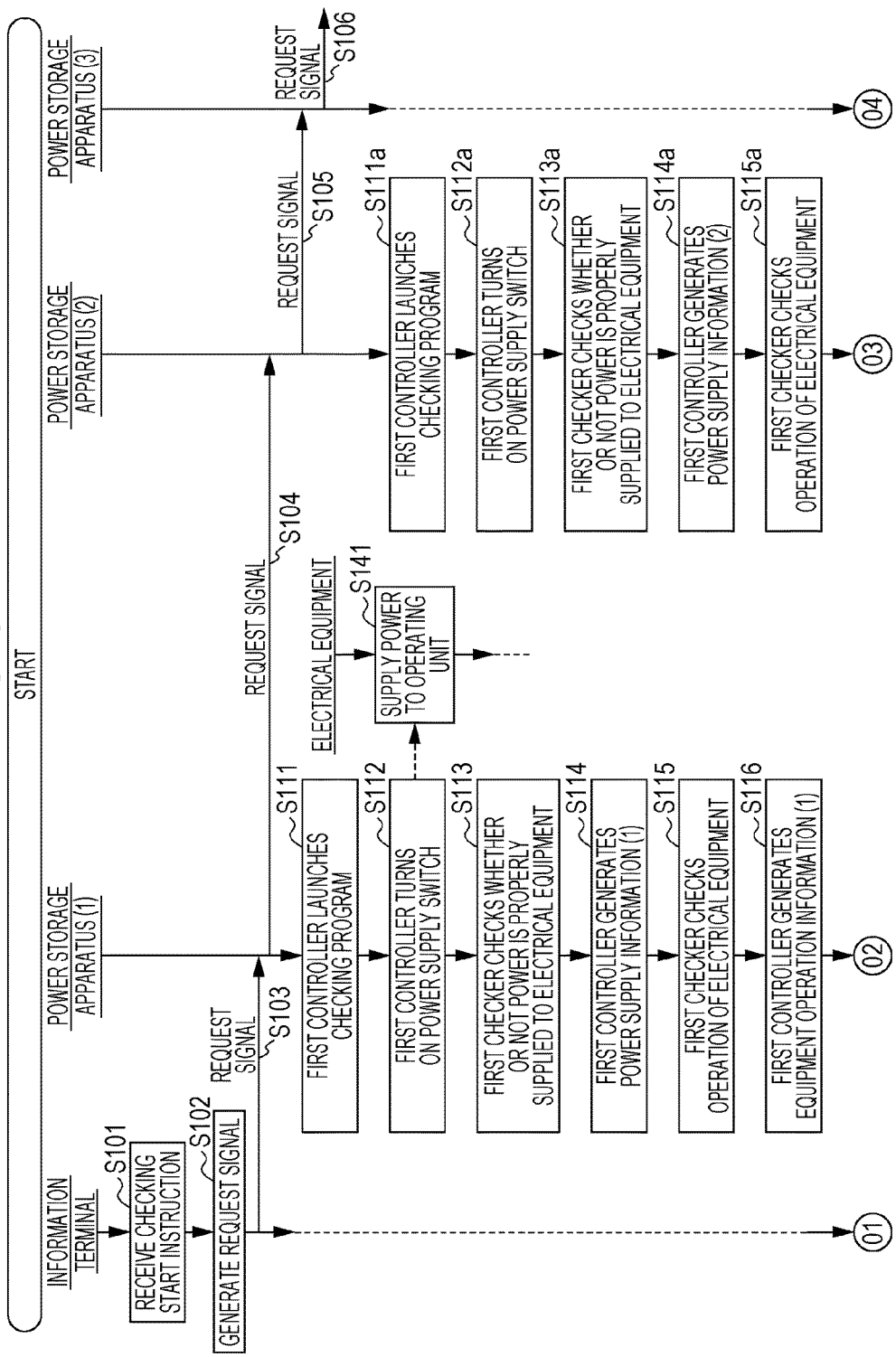
FIG. 6 is a sequence diagram (part 1) illustrating operations in the inspection system.
Figure 7:
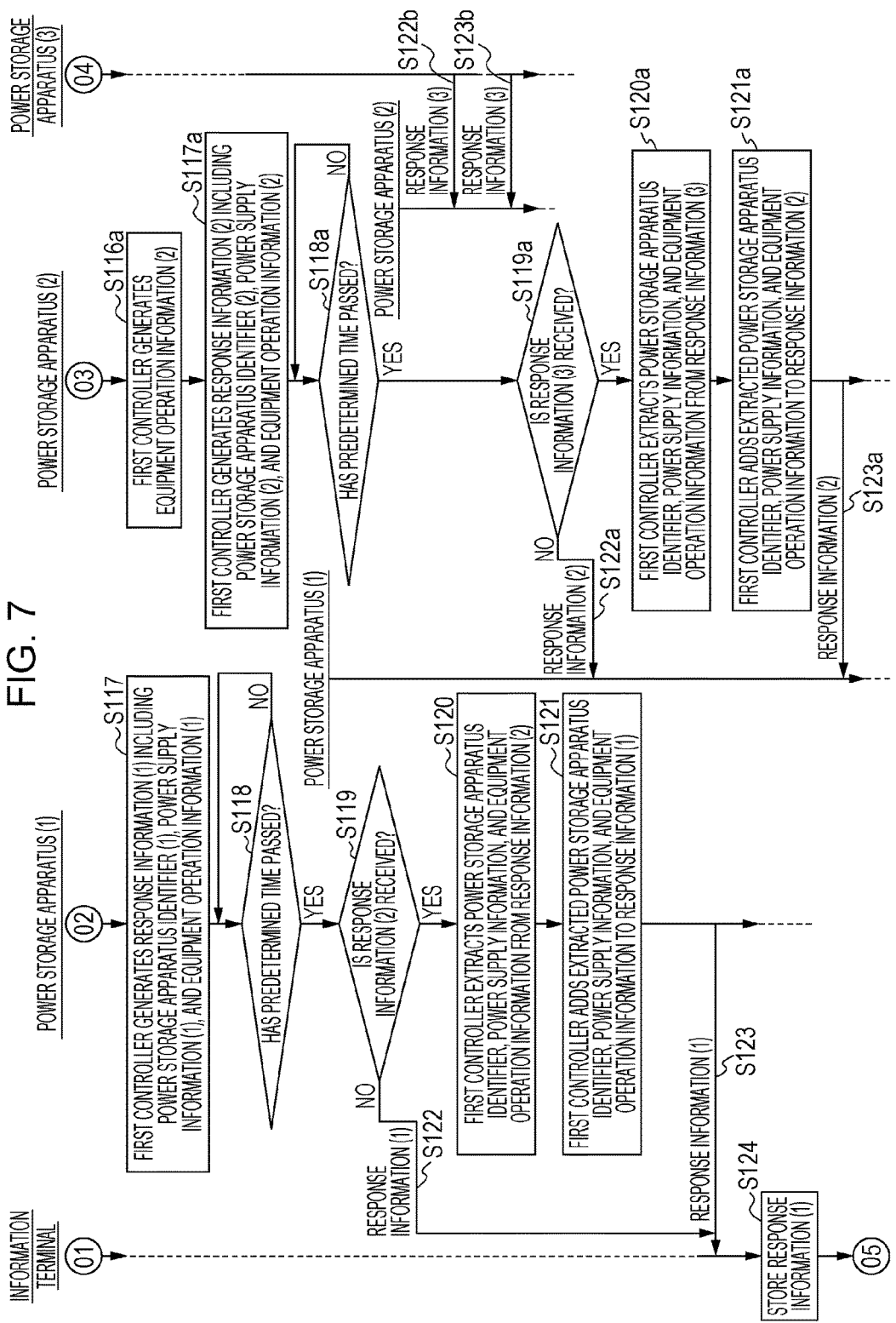
FIG. 7 is a sequence diagram (part 2) illustrating the operations in the inspection system.
Figure 8:
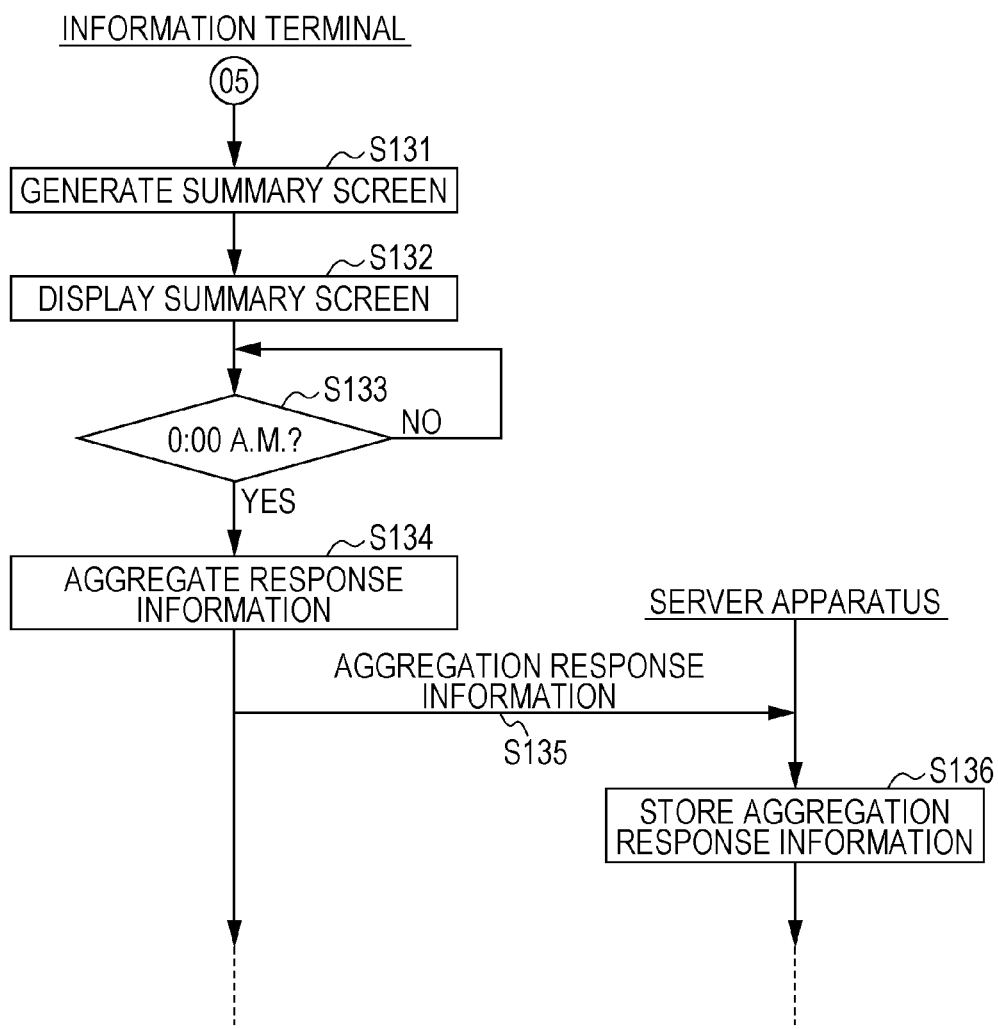
FIG. 8 is a sequence diagram (part 3) illustrating the operations in inspection system.

FIGS. 6 to 8 are sequence diagrams illustrating operations in the inspection system 10.

The operations in the inspection system 10 will now be described with reference to the sequence diagrams illustrated in FIGS. 6 to 8.

The touch panel 309 receives a checking start instruction (step S101). The controller 303 generates a request signal for requesting information regarding whether or not the power supply operation that the power storage apparatus performs on the guide light is normal (step S102). The short-range wireless communicator 302 transmits the request signal through a short-range wireless communication (step S103).

The first communicator 205 in the power storage apparatus 200a receives the request signal through the short-range wireless communication (step S103). The first communicator 205 transmits the request signal through a short-range wireless communication (step S104).

The first controller 203 launches a checking program (step S111). The first controller 203 turns on the power supply switch (step S112). The storage battery 201 supplies power to the operating unit 103 through the power supply circuit 208 (step S141).

The first checker 204 checks whether or not power is properly supplied to the guide light 100 (step S113). The first controller 203 generates power supply information (1) (step S114). Next, the first checker 204 checks the operation of the guide light 100 (step S115). The first controller 203 generates equipment operation information (1) (step S116). The first controller 203 generates response information (1) including a power storage apparatus identifier (1), the power supply information (1), and the equipment operation information (1) (step S117).

Next, the first controller 203 checks whether or not a predetermined time has passed (step S118). The predetermined time in this case is a time that is sufficient for receiving response information (2) generated by the power storage apparatus 200b for the guide light 100b. For example, the predetermined time is one minute. If the predetermined time has not passed ("NO" in step S118), the first controller 203 waits for the predetermined time to pass and then returns the control to step S118. If the predetermined time has passed ("YES" in step S118), the first controller 203 checks whether or not the response information (2) generated by the power storage apparatus 200b for the guide light 100b is received (step S119). If the response information (2) is not received ("NO" in step S119), the first communicator 205 transmits the response information (1) through a short-range wireless communication (step S122). If the response information (2) is received ("YES" in step S119), the first controller 203 extracts a power storage apparatus identifier, power supply information, and equipment operation information from the response information (2) (step S120). Next, the first controller 203 adds the extracted power storage apparatus identifier, power supply information, and equipment operation information to the response information (1) (step S121). Next, the first communicator 205 transmits, through a short-range wireless communication, the response information (1) to which the power storage apparatus identifier, the power supply information, and the equipment operation information are added (step S123).

Referring back to FIG. 6, the first communicator 205 in the power storage apparatus 200b receives the request signal through the short-range wireless communication (step S104). The first communicator 205 in the power storage apparatus 200b transmits the request signal through a short-range wireless communication (step S105).

Next, the power storage apparatus 200b for the guide light 100b operates in the same manner as in steps S111 to S117 described above (step S111a to S117a). Power supply information (2) is generated in step S114a, equipment operation information (2) is generated in step S116a, and the response information (2) is generated in step S117a.

Next, the power storage apparatus 200b for the guide light 100b operates in the same manner as in steps S118 to S123 described above (step S118a to S123a). In step S119a, a determination is made as to whether or not response information (3) is received. In step S120a, a power storage apparatus identifier, power supply information, and equipment operation information are extracted from the response information (3). In step S121a, the extracted power storage apparatus identifier, power supply information, and equipment operation information are added to the response information (2). In steps S122a and S123a, the response information (2) is transmitted.

Referring back to FIG. 6, the first communicator 205 in the power storage apparatus 200c receives the request signal through the short-range wireless communication (step S105). The first communicator 205 transmits the request signal through a short-range wireless communication (step S106). Next, the power storage apparatus 200c for the guide light 100c operates in the same manner as in steps S111 to S123 described above. In steps S122b and S123b, the response information (3) is transmitted.

The short-range wireless communicator 302 receives the response information (1) through the short-range wireless communication (step S122 or S123). The controller 303 writes the response information (1) to the information storage unit 304 (step S124).

The controller 303 generates a summary screen for displaying information including the power supply information of the power storage apparatuses and the equipment operation information of the guide lights 100 (electrical equipment) connected to the power storage apparatuses (step S131). The touch panel then 309 displays the generated summary screen (step S132).

The controller 303 determines whether or not the present time is 0:00 a.m. (step S133). If the present time is not 0:00 a.m. ("NO" instep S133), the controller 303 waits for a time to pass and then returns the control to step S133. If the present time is 0:00 a.m. ("YES" in step S133), the controller 303 aggregates the response information stored in the information storage unit 304 to generate aggregation response information (step S134). Next, the mobile communicator 301 transmits the generated aggregation response information to the server apparatus 400 through a mobile phone network or the Internet (step S135).

The communicator in the server apparatus 400 receives the aggregation response information (step S135). The controller in the server apparatus 400 writes the aggregation response information to the information storage unit (step S136).

Thereafter, the series of processes in the inspection system 10 ends.

Modifications

The first controller 203 in the power storage apparatus 200 may store response information received from another guide light 100. In this case, the response information generated by the first controller 203 for each guide light 100 further includes date-and-time information (date, hour, minute, and second) when the response information was generated.

The first controller 203 compares the power storage apparatus identifier and the date-and-time information included in the received response information with the power storage apparatus identifier and the date-and-time information included in the stored response information. When they match each other, the first controller 203 discards the received response information without processing the response information.

With such an operation, it is possible to avoid receiving the same response information.

The request signal generated by the controller 303 in the information terminal 300 may also include date-and-time information (date, hour, minute, and second) when the request signal is generated.

Upon receiving the request signal for requesting the information regarding whether or not the power supply operation that the power storage apparatus performs on the guide light is normal, the first controller 203 in the power storage apparatus 200 extracts the date-and-time information from the received request signal. Next, the first controller 203 compares the date and time indicated by the extracted date-and-time information with the present time (date, hour, minute, and second). When the difference between the date and time and the present time is a predetermined time (e.g., 5 minutes), the first controller 203 discards the received request signal without processing the request signal.

With such an operation, it is possible to avoid receiving the same request signal. For example, when the controller 303 in the information terminal 300 generates and transmits two request signals with an interval larger than or equal to a predetermined time, the power storage apparatus 200 for each guide light 100 determines that the two request signals are valid and performs processing. On the other hand, when the controller 303 in the information terminal 300 generates and transmits two request signals with an interval smaller than the predetermined time, the power storage apparatus 200 for each guide light 100 regards the first request signal as being valid and performs processing and regards the subsequent request signal as being erroneous and discards it.

Second Embodiment

A description will be given of an inspection system 20 according to a second embodiment of the present disclosure.

The inspection system 20 has a configuration that is similar to that of the inspection system 10. Now, differences from the inspection system 10 will be mainly described.

Figure 9:
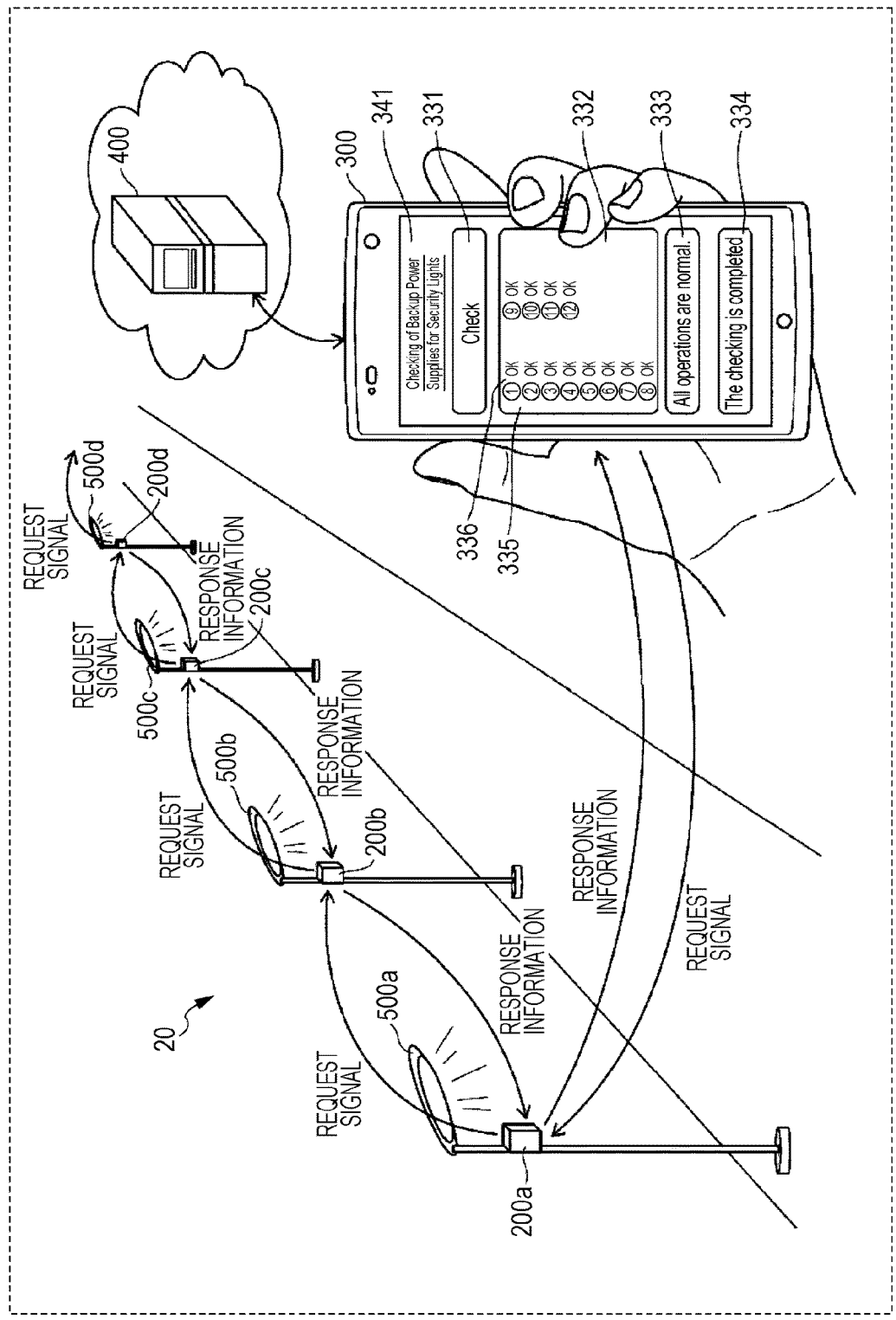
FIG. 9 is a system block diagram illustrating the configuration of an inspection system according to a second embodiment.

FIG. 9 is a system block diagram illustrating the configuration of the inspection system 20.

As illustrated in FIG. 9, the inspection system 20 includes street lights 500a, 500b, 500c, 500d, . . . , instead of the guide lights 100a, 100b, 100c, 100d, . . . in the inspection system 10. The street lights are one example of electrical equipment in the present disclosure.

Thus, as illustrated in FIG. 9, the inspection system 20 includes the street lights 500a, 500b, 500c, 500d, . . . , the information terminal 300, and the server apparatus 400.

The street lights 500a, 500b, 500c, 500d, . . . are installed in one line in this order on a road at predetermined intervals. Also, the power storage apparatuses 200a, 200b, 200c, 200d, . . . are connected to the street lights 500a, 500b, 500c, 500d, . . . , respectively. The power storage apparatus may detachably connect to the street light via a connector, not shown, of the power storage apparatus.

The street lights 500a, 500b, 500c, 500d, . . . have substantially the same structure. The street lights 500a, 500b, 500c, 500d, . . . are referred to as "street lights 500" in the following description.

Figure 10:
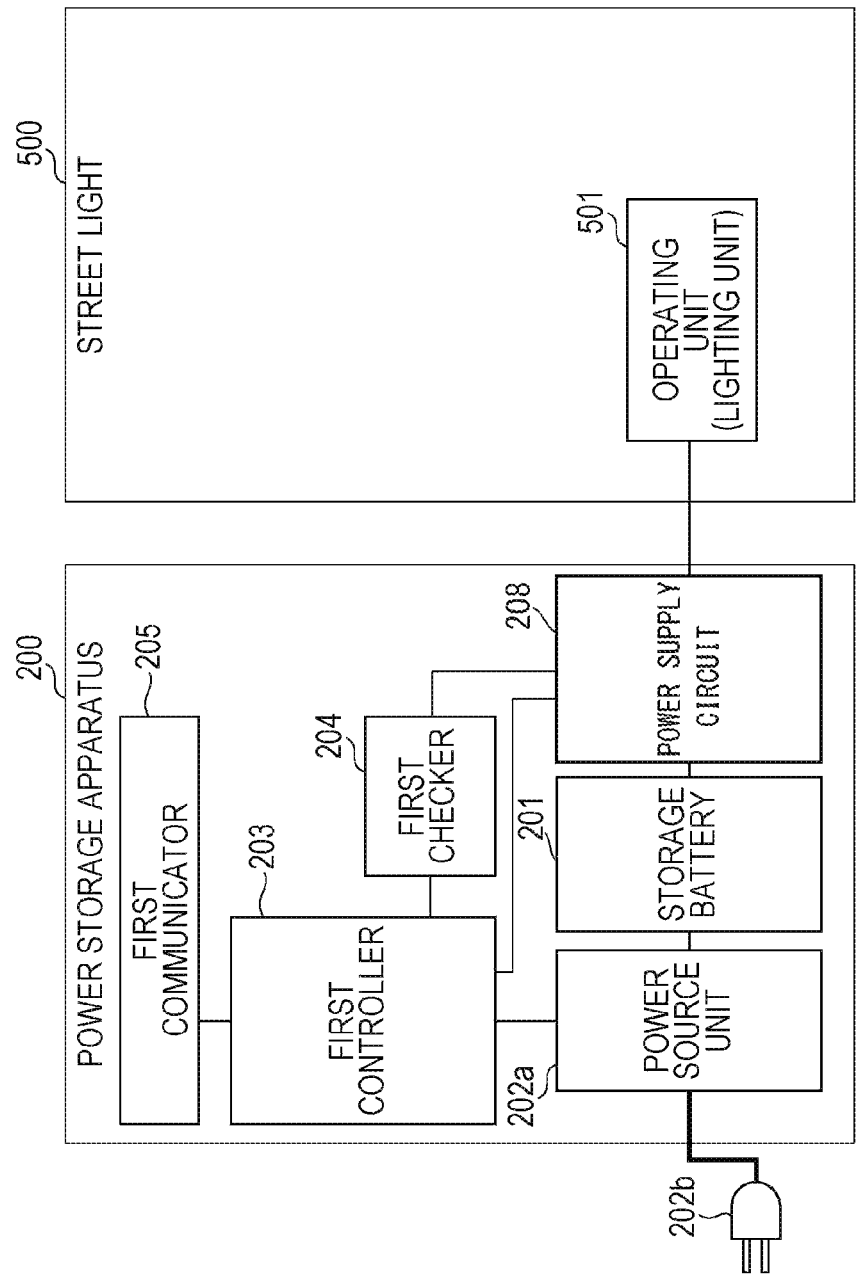
FIG. 10 is a block diagram illustrating the functional configuration of a street light and a power storage apparatus.

As illustrated in FIG. 10, a power storage apparatus 200 is connected to each street light 500. The street light 500 includes an operating unit 501, and the operating unit 501 is, for example, a lighting unit and is implemented by an LED, a fluorescent lamp, a halogen lamp, or the like. The lighting unit emits light by using power supplied from the power storage apparatus 200. The power storage apparatus 200 supplies the DC power to the street light 500. The street light 500 may be a DC type light or an AC type light. In case the street light 500 may be a DC type light, the DC power from the power storage apparatus 500 is converted to AC power via a DC/AC converter provided with the street light 500.

The power storage apparatus 200 has a configuration that is the same as or similar to that of the power storage apparatus 200 for the guide light 100 in the inspection system 10. The power storage apparatus 200 includes a power source unit 202a and a plug 202b, instead of the solar cells 202 in the power storage apparatus 200 for each guide light 100 in the inspection system 10. Thus, as illustrated in FIG. 10, the power storage apparatus 200 includes the storage battery 201, the power source unit 202a, the plug 202b, the first controller 203, the first checker 204, the first communicator 205, and the power supply circuit 208. The plug 202b is connected to a commercial power supply and receives AC power supplied from the commercial power supply. The power source unit 202a includes a AC/DC converter which converts the AC power from the commercial power supply to DC power. The storage battery 201 is charged with DC power outputted from the power source unit 202a.

The street lights 500b, 500c, 500d, . . . are also configured similarly to the street light 500a. Thus, since the street lights 500a, 500b, 500c, 500d, . . . illuminate the road, pedestrians can walk with feelings of security even in the nighttime.

There is a possibility that the amount of power remaining in the power storage apparatus 200 provided for each guide light 100 decreases, an abnormality occurs in the storage battery 201, an abnormality occurs in the power supply circuit 208, or a failure occurs in the operating unit 501. Accordingly, an inspector of the inspection system 20 checks the street lights 500a, 500b, 500c, 500d, . . . in the same manner as in the inspection system 10.

Since the data structure of the response information and the specific operation sequence in the inspection system 20 are analogous to those in the inspection system 10 in the first embodiment, descriptions thereof are not given hereinafter.

In the second embodiment and each modification described below, the direction from the information terminal 300 to the street light 500a, the direction from the street light 500a to the street light 500b, the direction from the street light 500b to the street light 500c, and the direction from the street light 500c to the street light 500d are referred to as a "downstream direction (downstream side)". The downstream direction is a direction in which the request signal for requesting information regarding whether or not the power supply operation that the power storage apparatus performs on the street light is normal is transmitted. On the other hand, the direction from the street light 500d to the street light 500c, the direction from the street light 500c to the street light 500b, the direction from the street light 500b to the street light 500a, and the direction from the street light 500a to the information terminal 300 are referred to as an "upstream direction (upstream side)". The upstream direction is a direction in which the response information is transmitted.

First Modification

Now, with respect to an inspection system 20a according to a first modification of the inspection system 20 in the second embodiment, differences from the inspection system 20 will be mainly described.

The inspection system 20a includes street lights 500h, . . . , the information terminal 300, and the server apparatus 400.

Figure 11:
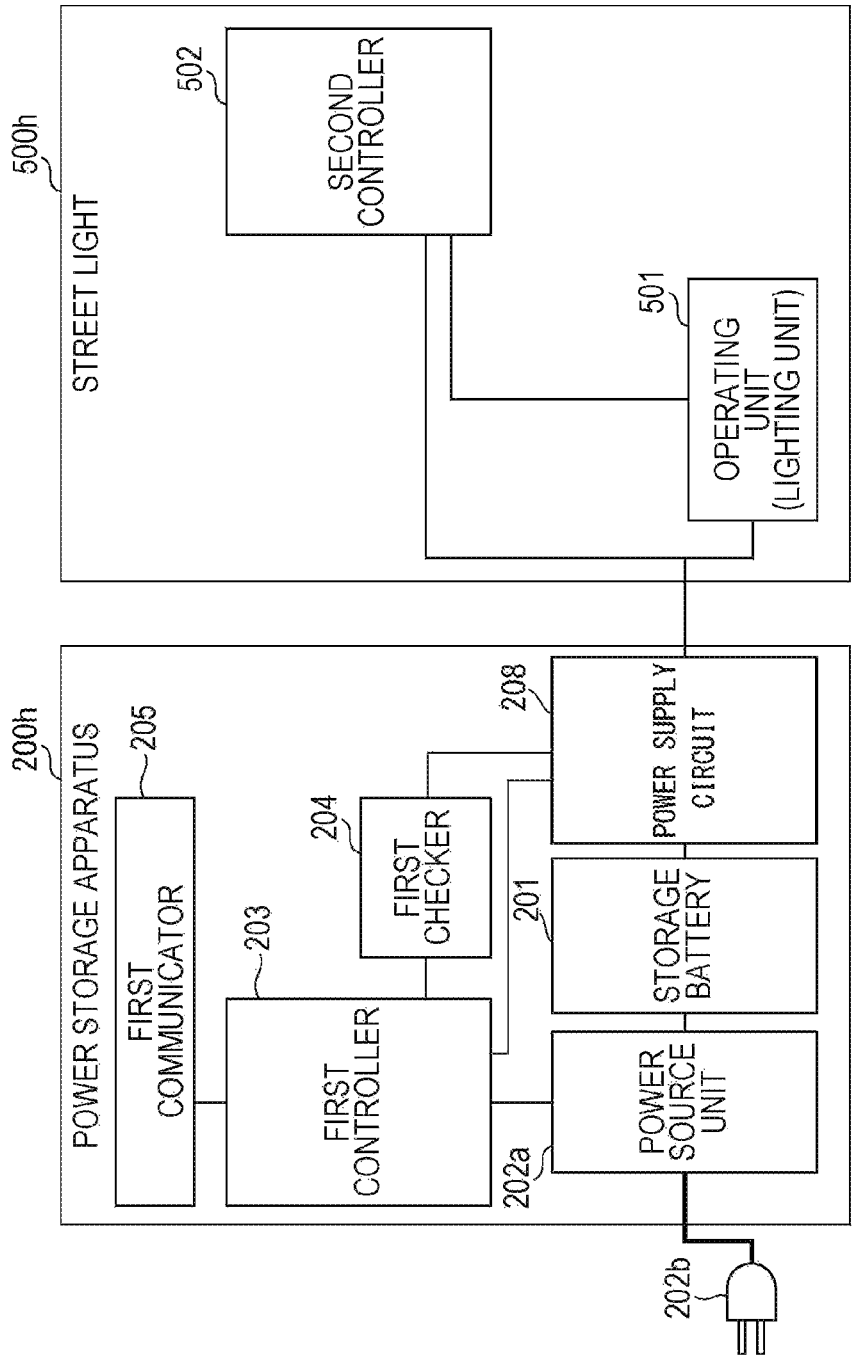
FIG. 11 is a block diagram illustrating the functional configuration of a street light and a power storage apparatus in a first modification.

As illustrated in FIG. 11, a power storage apparatus 200h is connected to each street light 500h. As illustrated in FIG. 11, the power storage apparatus 200h includes a storage battery 201, a power source unit 202a, a plug 202b, a first controller 203a, a first checker 204, a first communicator 205, and a power supply circuit 208. As illustrated in FIG. 11, the street light 500h includes an operating unit 501 and a second controller 502.

The second controller 502 has a storage unit (not illustrated) in which a computer program for control is stored and a computational processing unit (not illustrated). A processor operates in accordance with the computer program for control, so that the second controller 502 realizes its functions. Examples of the computational processing unit include an MPU and a CPU. One example of the storage unit is a memory. The second controller 502 may be implemented by a single controller that performs centralized control or may be configured by a plurality of controllers that perform distributed control in cooperation with each other.

The storage battery 201, the power source unit 202a, the plug 202b, the first controller 203a, the first checker 204, the first communicator 205, and the power supply circuit 208 have configurations that are the same as or similar to those of the storage battery 201, the power source unit 202a, the plug 202b, the first controller 203, the first checker 204, the first communicator 205, and the power supply circuit 208 in the power storage apparatus 200 in the inspection system 20. The operating unit 501 in the street light 500h has a configuration that is the same as or similar to that of the operating unit 501 in the street light 500 in the inspection system 20.

Upon receiving a request signal, the first controller 203a executes the checking program.

Upon executing the checking program, the first controller 203a turns on the power supply switch (FET) included in the power supply circuit 208.

When the power supply switch is turned on, the storage battery 201 supplies power to the second controller 502 in the street light 500h. When the power is supplied, the second controller 502 starts the operation of the operating unit 501.

When the operation of the operating unit 501 is started, the first checker 204 checks whether or not power is properly supplied from the storage battery 201 to the street light 500h. The first checker 204 also checks whether or not the street light 500h is operating properly.

Next, operations in the inspection system 20a will be described with reference to the sequence diagram illustrated in FIG. 12. The operations in the inspection system 20a are analogous to the operations in the inspection system 10. Now, differences from the operations in the inspection system 10 will be mainly described.

Figure 12:
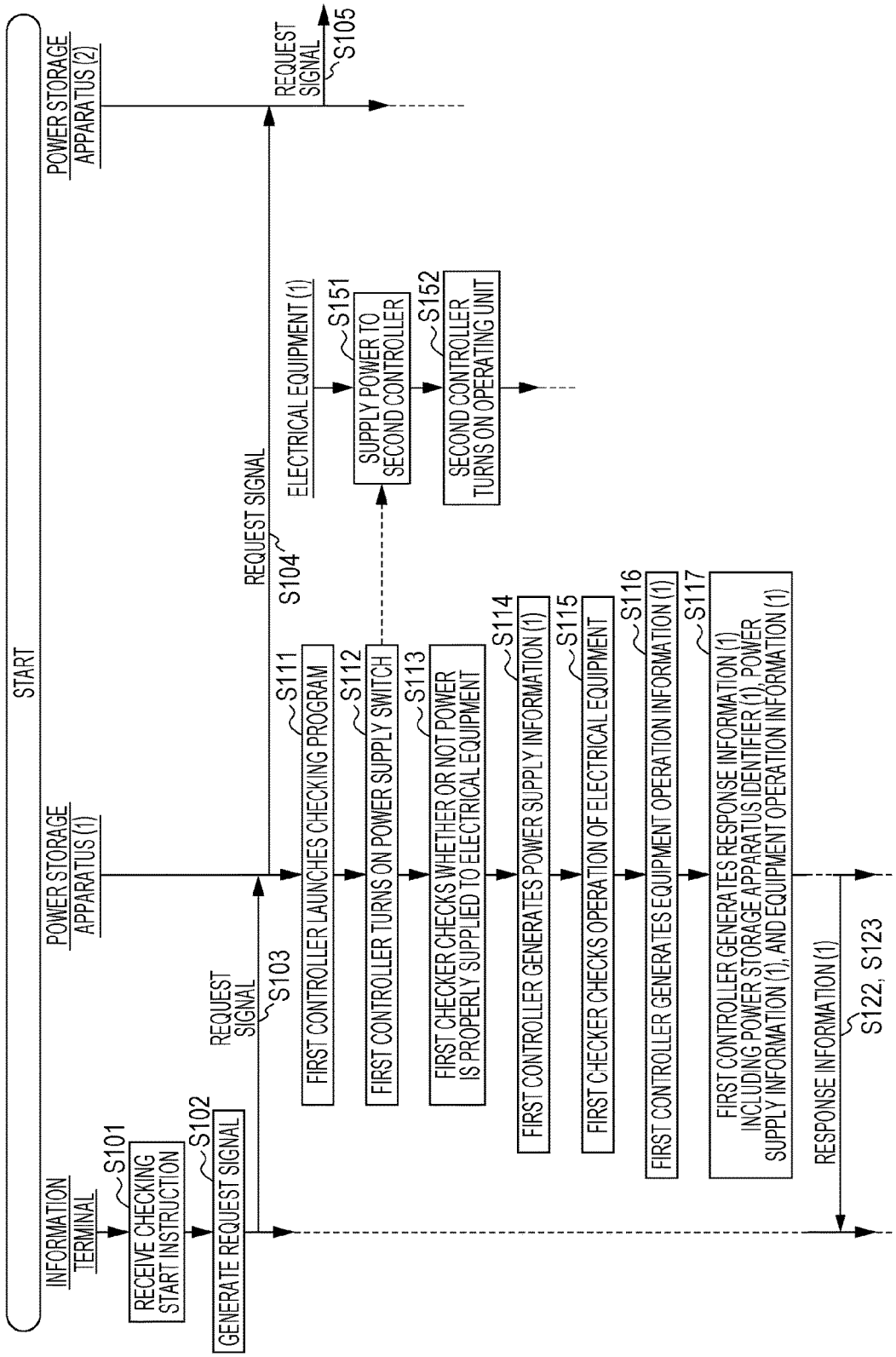
FIG. 12 is a sequence diagram illustrating operations in the first modification.

Steps S101 to S105 and S111 to S123 illustrated in FIG. 12 are substantially the same as steps S101 to S105 and S111 to S123 illustrated in FIGS. 6 and 7.

When the first controller 203a turns on the power supply switch (FET) included in the power supply circuit 208 in step S112, power is supplied from the storage battery 201 to the second controller 502 in the street light 500h (step S151). Next, the second controller 502 starts the operation of the operating unit 501 (step S152).

The operations subsequent to step S117 illustrated in FIG. 12 are substantially the same as the operations illustrated in the sequence diagrams in FIGS. 7 and 8.

Second Modification

Now, with respect to an inspection system 20b according to a second modification of the inspection system 20 in the second embodiment, differences from the inspection system 20 will be mainly described.

The inspection system 20b includes street lights 500i, . . . , the information terminal 300, and the server apparatus 400.

Figure 13:
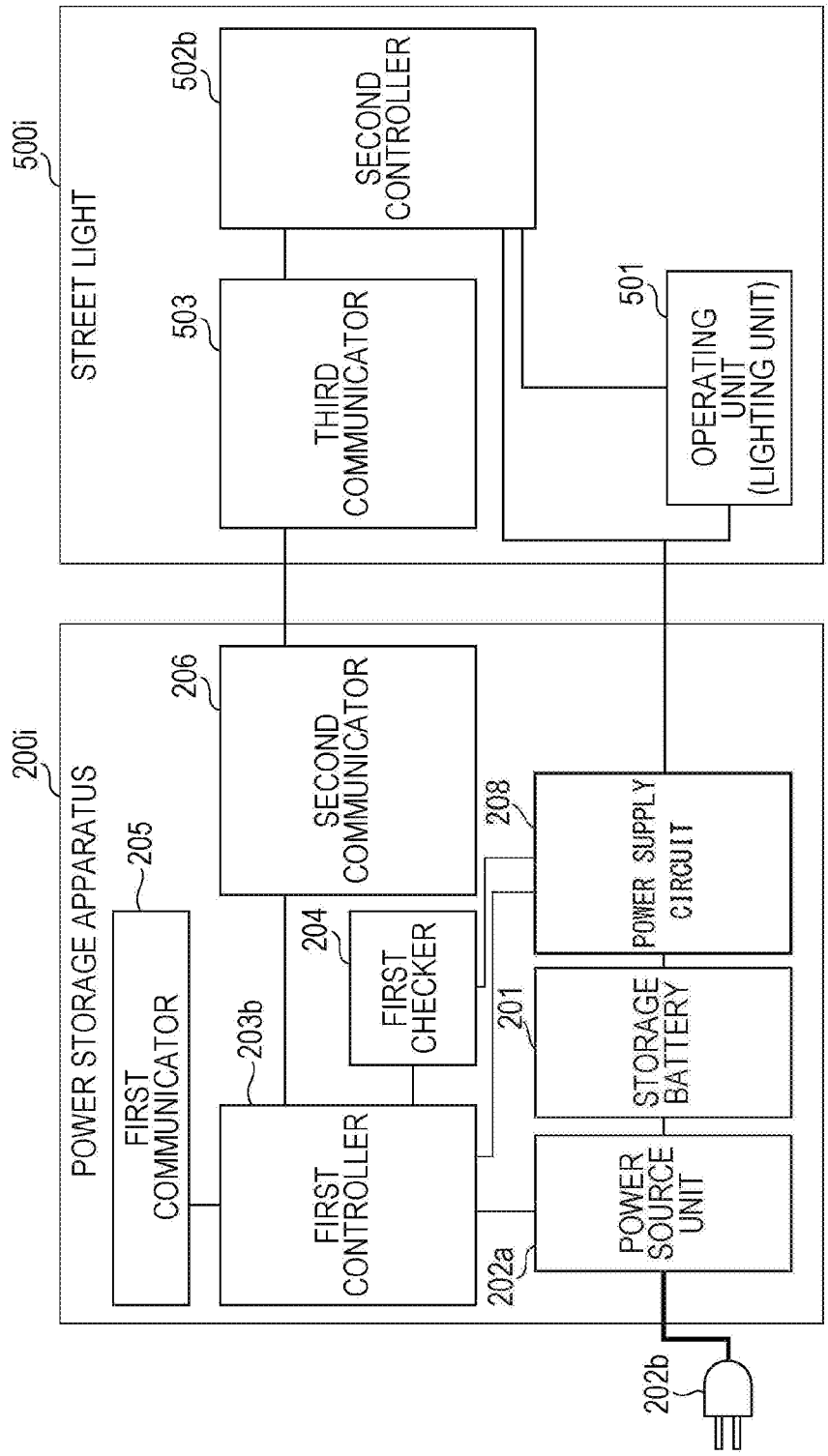
FIG. 13 is a block diagram illustrating the functional configuration of a street light and a power storage apparatus in a second modification.

As illustrated in FIG. 13, a power storage apparatus 200i is connected to each street light 500i. As illustrated in FIG. 13, the power storage apparatus 200i includes a storage battery 201, a power source unit 202a, a plug 202b, a first controller 203b, a first checker 204, a first communicator 205, a second communicator 206, and a power supply circuit 208. As illustrated in FIG. 13, the street light 500i includes an operating unit 501, a second controller 502b, and a third communicator 503.

The second communicator 206 and the third communicator 503 have respective communication terminals for wired communication. The second communicator 206 and the third communicator 503 may be short-range wireless communicators.

The storage battery 201, the power source unit 202a, the plug 202b, the first controller 203b, the first checker 204, the first communicator 205, and the power supply circuit 208 have configurations that are the same as or similar to those of the storage battery 201, the power source unit 202a, the plug 202b, the first controller 203, the first checker 204, the first communicator 205, and the power supply circuit 208 in the power storage apparatus 200 in the inspection system 20. The operating unit 501 in the street light 500i also has a configuration that is the same as or similar to that of the operating unit 501 in the street light 500 in the inspection system 20.

The storage battery 201 constantly supplies power to the second controller 502b.

The second controller 502b periodically generates a confirmation signal. The second controller 502b periodically transmits the generated confirmation signal to the first controller 203b via the third communicator 503 and the second communicator 206.

The first controller 203b periodically receives the confirmation signal.

The "periodic reception" in this case is, for example, reception performed once a minute. The periodic reception may also be performed at another predetermined interval.

Since the power storage apparatus 200i periodically receives the confirmation signal from the street light 500i, the first controller 203b can confirm whether or not power is properly supplied from the power storage apparatus 200i to the street light 500i, by determining whether or not the confirmation signal is successfully received. Thus, it is possible to confirm whether or not power is properly supplied to the street light 500i, without executing the checking using the first checker 204.

After the checking, upon receiving a request signal for requesting the information regarding whether or not the power supply operation that the power storage apparatus 200i performs on the street light 500i is normal, the first controller 203b outputs a request signal for requesting information regarding whether or not the operation of the street light 500i is normal to the second controller 502b via the second communicator 206 and the third communicator 503. The first controller 203b also issues a request for executing the checking program to the second controller 502b.

Upon receiving the request for executing the checking program, the second controller 502b causes the operating unit 501 to start operating.

When the operation of the operating unit 501 is started, the first checker 204 checks whether or not the street light 500i is operating properly.

The first controller 203b adds the information regarding whether or not the operation of the street light 500i is normal, the information being received via the second communicator 206, to response information.

Next, operations in the inspection system 20b will be described with reference to the sequence diagrams illustrated in FIGS. 14 and 15. The operations in the inspection system 20b are analogous to the operations in the inspection system 10. Now, differences from the operations in the inspection system 10 will be mainly described.

Figure 14:
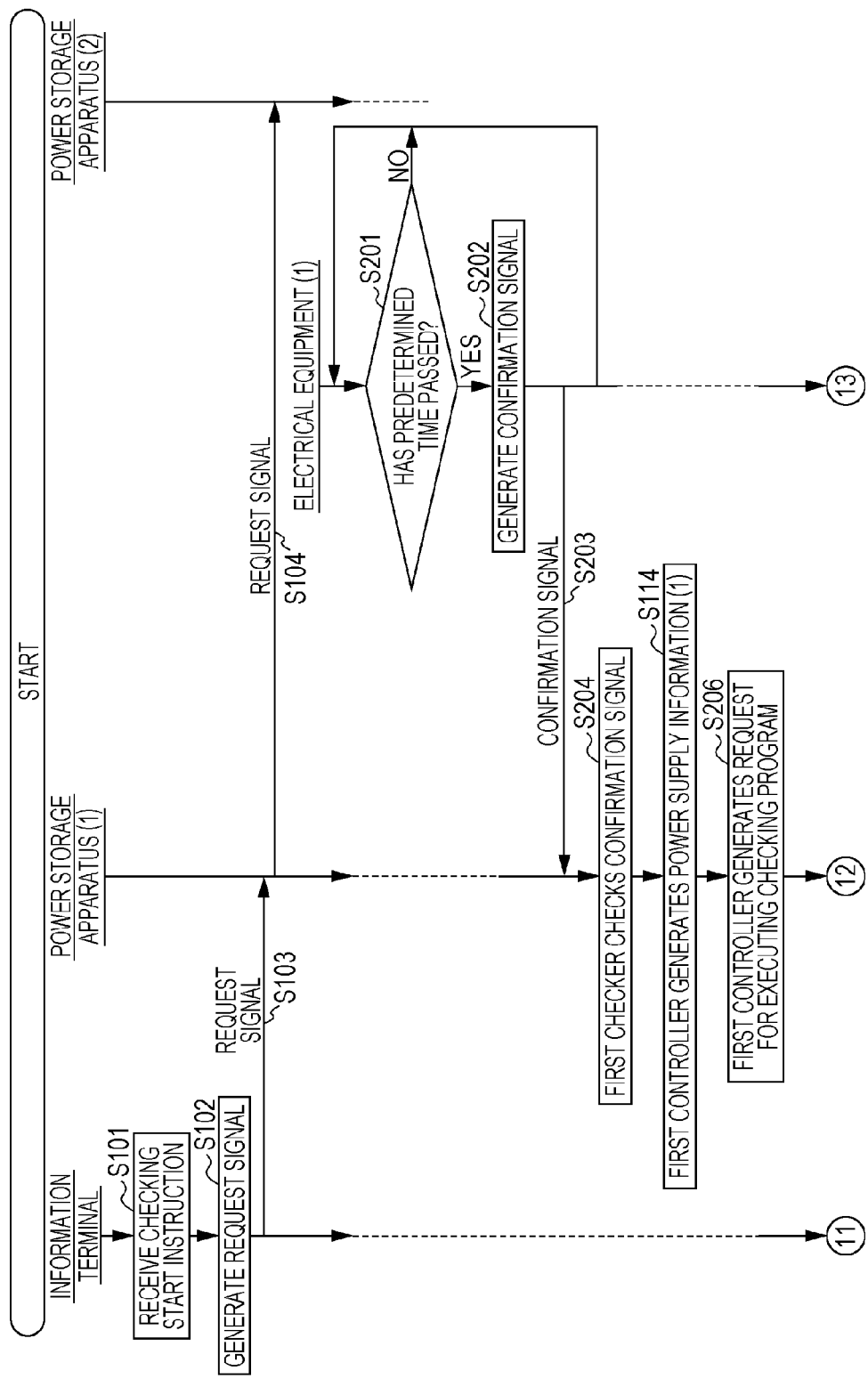
FIG. 14 is a sequence diagram (part 1) illustrating operations in the second modification.

Steps S101 to S104 illustrated in FIG. 14 are substantially the same as steps S101 to S104 illustrated in FIG. 6.

The second controller 502b confirms whether or not a predetermined time has passed (step S201). If the predetermined time has not passed ("NO" in step S201), the second controller 502b waits for the predetermined time to pass and returns the control to step S201. If the predetermined time has passed ("YES" in step S201), the second controller 502b generates a confirmation signal (step S202). Next, the second controller 502b returns the control to step S201. The second controller 502b also transmits the generated confirmation signal to the first controller 203b via the third communicator 503 and the second communicator 206 (step S203).

The first controller 203b determines whether or not the confirmation signal is received (step S204). This makes it possible to confirm whether or not power is properly supplied from the power storage apparatus 200i to the street light 500i.

Based on a determination result indicating whether or not the confirmation signal is received, the first controller 203b generates power supply information (1) (step S114).

Next, the first controller 203b generates a request for executing the checking program (step S206). The first controller 203b then transmits the request for executing the checking program to the second controller 502b via the second communicator 206 and the third communicator 503 (step S207).

The second controller 502b receives the request for executing the checking program (step S207). Upon receiving the request for executing the checking program, the second controller 502b causes the operating unit 501 to start operating (step S208).

Thereafter, operations that are similar to those in steps S115 to S123 in FIGS. 6 and 7 are performed.

Figure 15:
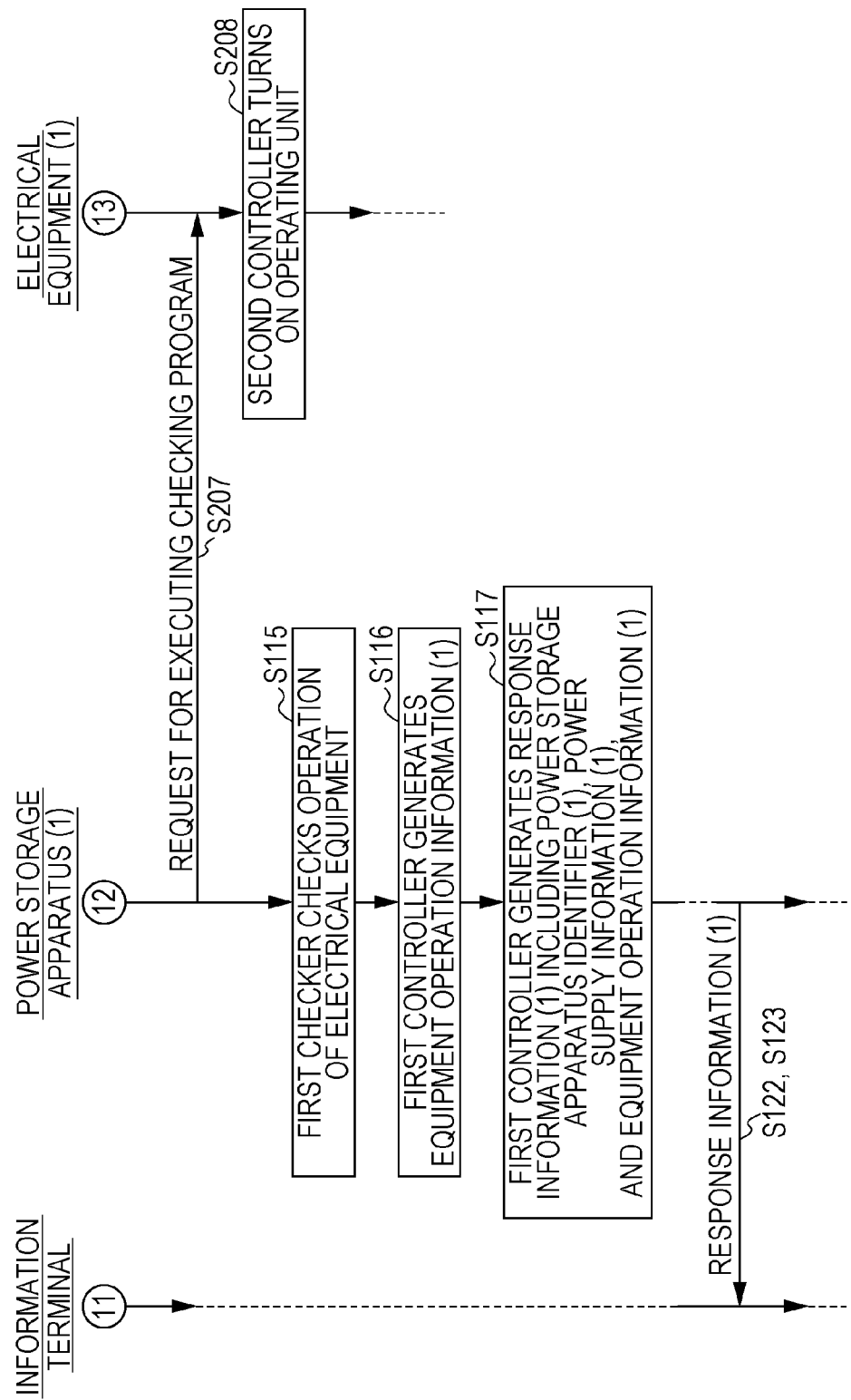
FIG. 15 is a sequence diagram (part 2) illustrating operations in the second modification.

Operations subsequent to step S117 illustrated in FIG. 15 are substantially the same as the operations illustrated in the sequence diagrams in FIGS. 7 and 8.

Third Modification

Now, with respect to an inspection system 20c according to a third modification of the inspection system 20b in the second modification described above, differences from the inspection system 20b will be mainly described.

The inspection system 20c includes street lights 500j, . . . , the information terminal 300, and the server apparatus 400.

Figure 16:
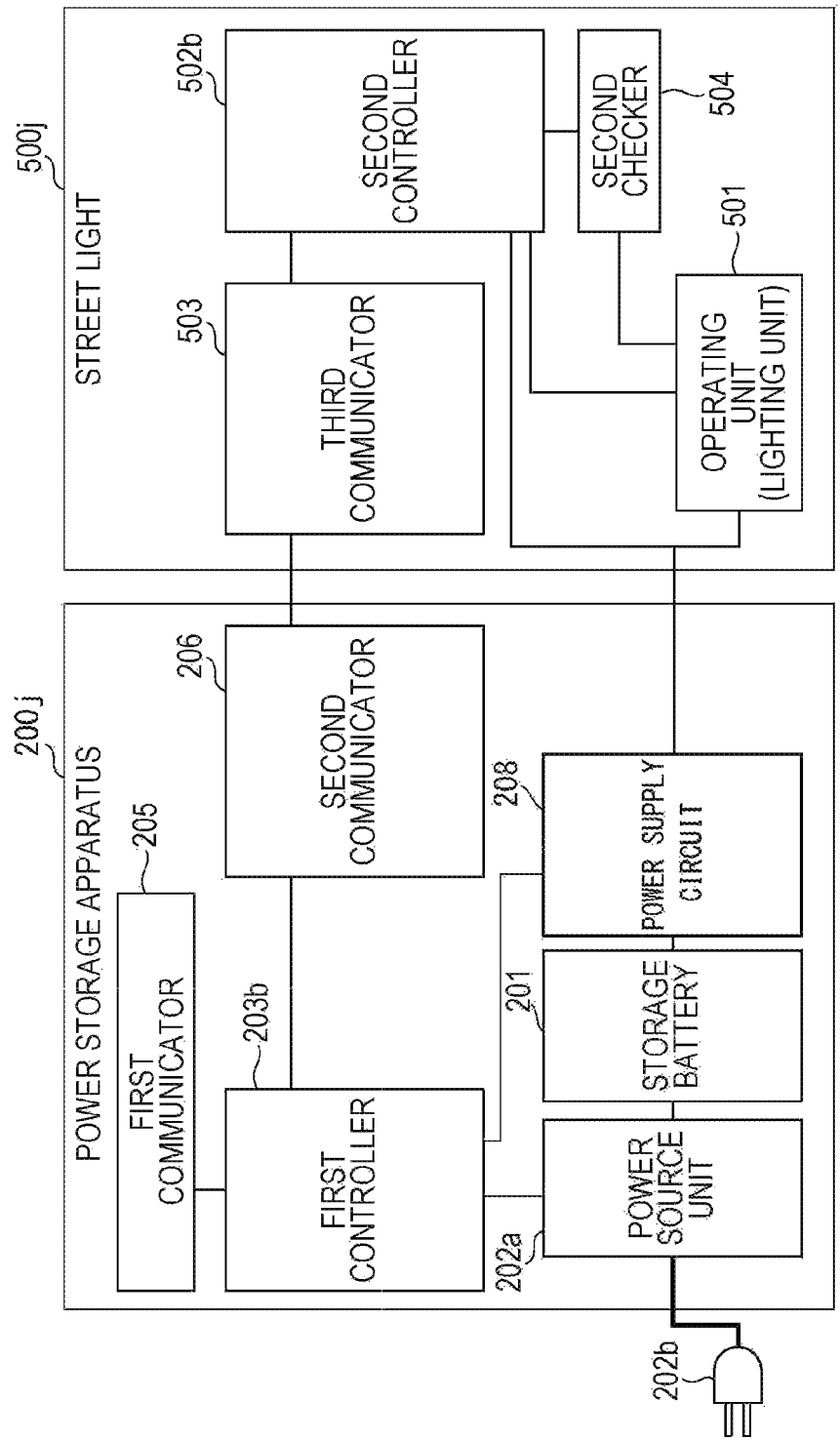
FIG. 16 is a block diagram illustrating the functional configuration of a street light and a power storage apparatus in a third modification.

As illustrated in FIG. 16, a power storage apparatus 200j is connected to each street light 500j. As illustrated in FIG. 16, the power storage apparatus 200j includes a storage battery 201, a power source unit 202a, a plug 202b, a first controller 203b, a first communicator 205, a second communicator 206 and a power supply circuit 208. As illustrated in FIG. 16, the street light 500j includes an operating unit 501, a second controller 502b, a third communicator 503, and a second checker 504.

The first controller 203b determines whether or not a confirmation signal is received. This makes it possible to confirm whether or not power is properly supplied from the power storage apparatus 200j to the street light 500j.

When the operation of the operating unit 501 is started, the second checker 504 checks whether or not the street light 500j is operating properly. The second checker 504 transmits a checking result to the first controller 203b via the second controller 502b, the third communicator 503, and the second communicator 206.

The first controller 203b receives the checking result from the second checker 504 via the second controller 502b, the third communicator 503, and the second communicator 206.

Next, by using the received checking result, the first controller 203b generates equipment operation information.

Next, operations in the inspection system 20c will be described with reference to the sequence diagram illustrated in FIG. 17. The operations in the inspection system 20c are analogous to the operations in the inspection system 20b. Now, differences from the operations in the inspection system 20b will be mainly described.

In the inspection system 20c, operations that are similar to those in steps S102 to S104, steps S201 to S204, S114, and S206 to S208 illustrated in FIGS. 14 and 15 are performed.

When the operation of the operating unit 501 is started in step S208, the second checker 504 checks whether or not the street light 500j is operating properly (step S241). Next, the second checker 504 transmits a checking result to the first controller 203b via the second controller 502b, the third communicator 503, and the second communicator 206 (step S242).

The first controller 203b then receives the checking result from the second checker 504 via the second controller 502b, the third communicator 503, and the second communicator 206 (step S242).

Next, operations that are similar to those in steps S116 to S123 illustrated in FIGS. 6 and 7 are performed.

Figure 17:
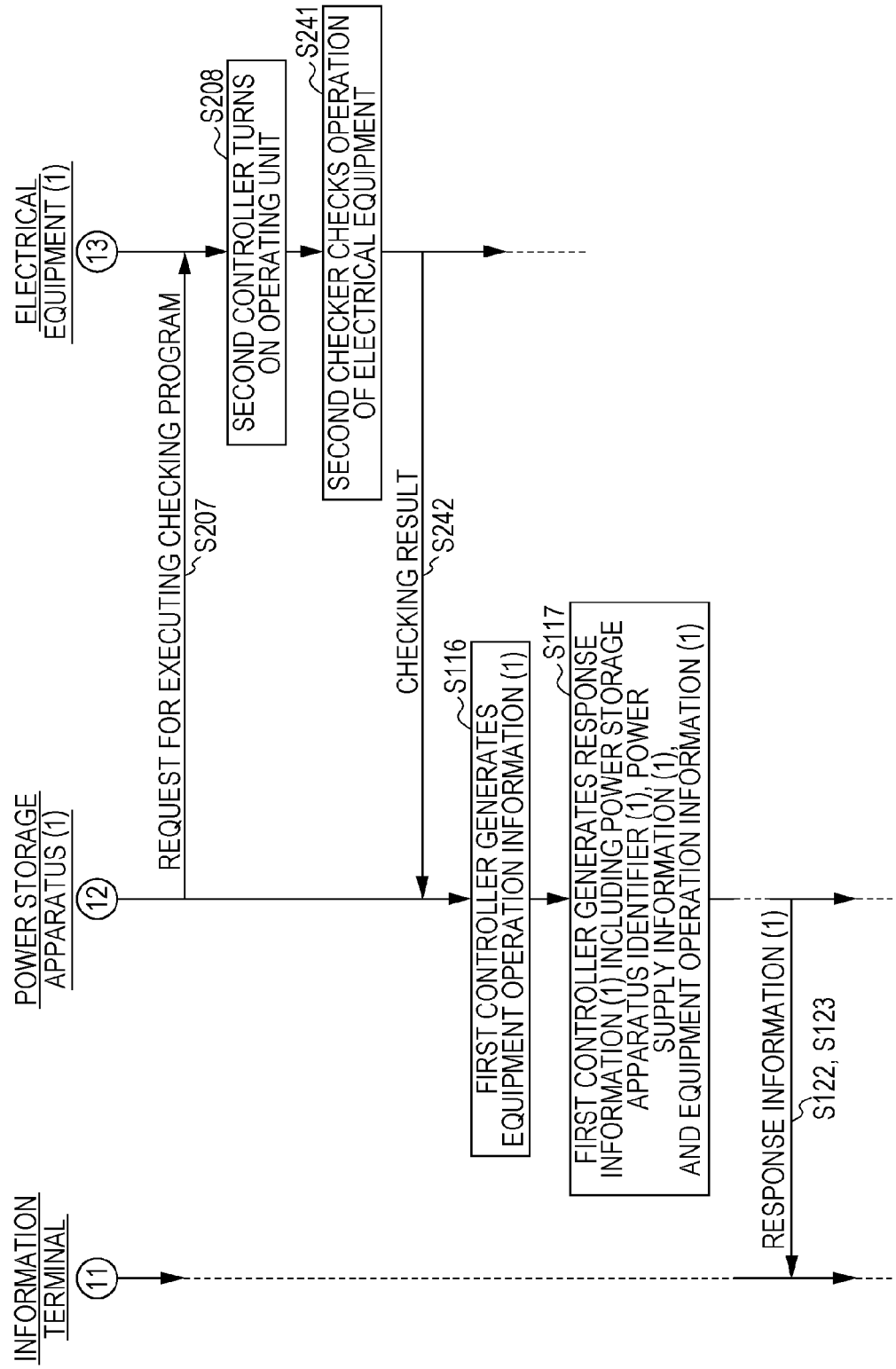
FIG. 17 is a sequence diagram illustrating operations in the third modification.

Operations subsequent to step S117 illustrated in FIG. 17 are substantially the same as the operations illustrated in the sequence diagrams in FIGS. 7 and 8.

Fourth Modification

Now, with respect to an inspection system 20d according to a fourth modification of the inspection system 20b in the second modification described above, differences from the inspection system 20b will be mainly described.

The inspection system 20d includes street lights 500i, . . . , the information terminal 300, and the server apparatus 400. The inspection system 20d has a configuration similar to that of the inspection system 20b.

Upon receiving a request signal, the first controller 203b executes the checking program.

When the execution of the checking program is started, the first controller 203b turns on the power supply switch (FET) included in the power supply circuit 208.

When the power supply switch is turned on, the storage battery 201 supplies power to the second controller 502 in the street light 500i. When the power is supplied, the second controller 502 starts the operation of the operating unit 501. Also, when the power is supplied, the second controller 502 periodically generates a confirmation signal and transmits the generated confirmation signal to the first controller 203b via the third communicator 503 and the second communicator 206.

As described above, in the inspection system 20d, the storage battery 201 does not constantly supply power to the second controller 502b. In the inspection system 20d, upon start of the checking, the storage battery 201 supplies power to the second controller 502b.

Next, operations in the inspection system 20d will be described with reference to the sequence diagram illustrated in FIG. 18. The operations in the inspection system 20d are analogous to the operations in the inspection system 20b. Now, a description will be mainly given of differences from the operations in the inspection system 20b.

Figure 18:
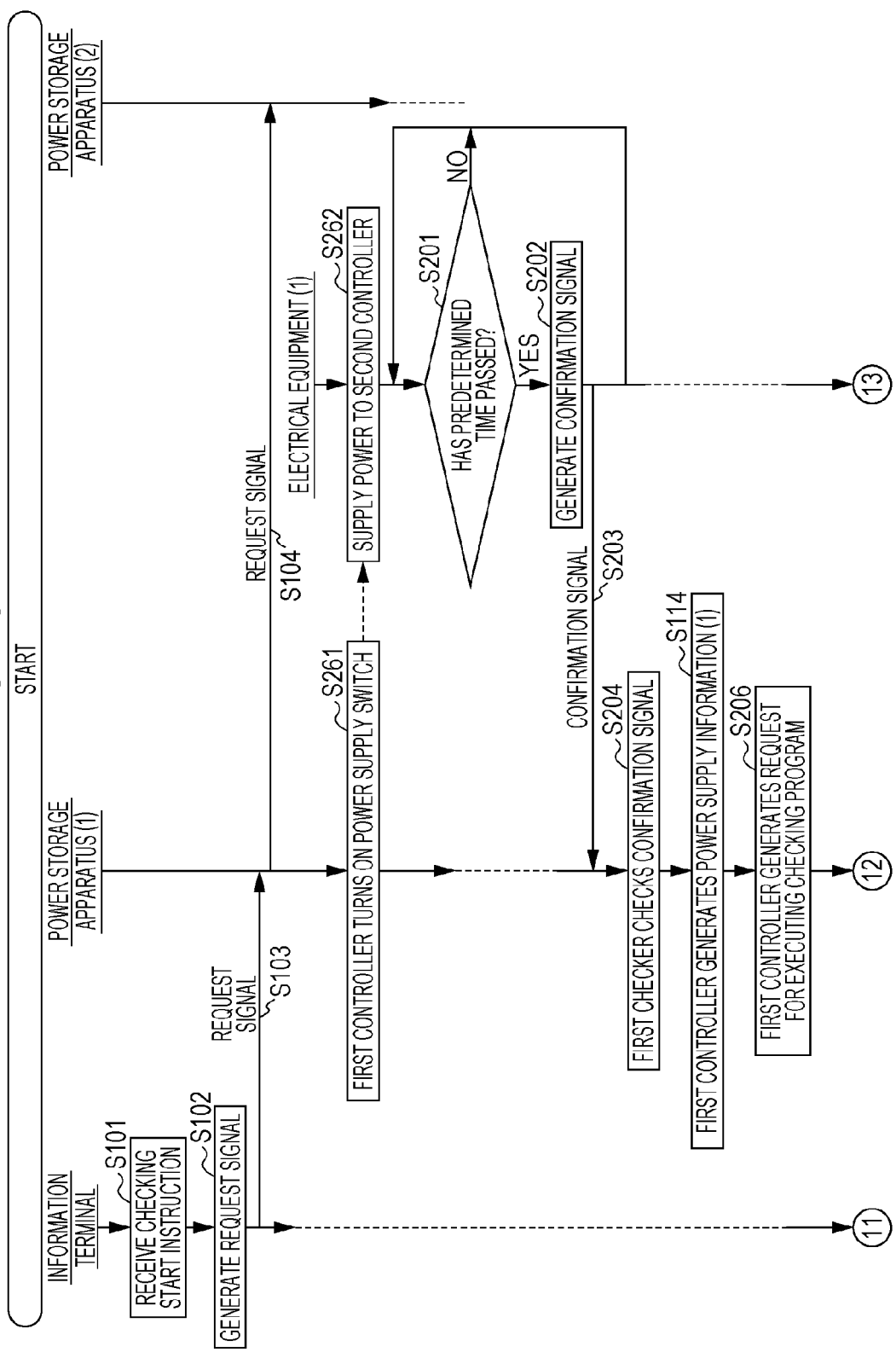
FIG. 18 is a sequence diagram illustrating operations in a fourth modification.

Steps S101 to S104 illustrated in FIG. 18 are substantially the same as steps S101 to S104 illustrated in FIG. 14.

Upon receiving the request signal (step S103), the first controller 203b turns on the power supply switch (FET) included in the power supply circuit 208 (step S261).

When the power supply switch is turned on, the storage battery 201 supplies power to the second controller 502 in the street light 500i (step S262).

After the power is supplied to the second controller 502 in the street light 500i, operations that are similar to those in steps S201 to S204, S114, S206 to S208, and S115 to S123 illustrated in FIGS. 14 and 15 are performed.

Operations subsequent to step S206 illustrated in FIG. 18 are substantially the same as the operations illustrated in the sequence diagram in FIG. 15.

Fifth Modification

Now, with respect to an inspection system 20e according to a fifth modification of the inspection system 20d in the fourth modification described above, differences from the inspection system 20d will be mainly described.

The inspection system 20e includes street lights 500k . . . , the information terminal 300, and the server apparatus 400.

As illustrated in FIG. 19, a power storage apparatus 200k is connected to each street light 500k. As illustrated in FIG. 19, the power storage apparatus 200k includes a storage battery 201, a power source unit 202a, a plug 202b, a first controller 203b, a first checker 204, a first communicator 205, a second communicator 206 and a power supply circuit 208. Also, as illustrated in FIG. 19, the street light 500k includes an operating unit 501, a second controller 502b, a third communicator 503, and a second checker 504.

The first checker 204 checks whether or not power is properly supplied from the power storage apparatus 200k to the street light 500k.

The second checker 504 checks whether or not the street light 500k is operating properly. The second checker 504 transmits a checking result to the first controller 203b via the second controller 502b, the third communicator 503, and the second communicator 206.

The first controller 203b receives the checking result from the second checker 504 via the second controller 502b, the third communicator 503, and the second communicator 206. Next, by using the received checking result, the first controller 203b generates equipment operation information.

(Supplementary Description)

A supplementary description will be given of details of checking the operations of the street lights in the second to fourth modifications.

An operation test is performed with settings based on the assumption that the present time is in the daytime or in the nighttime. A case in which the commercial power supply (a power system) is properly supplying power, a case in which there is a power failure, and a case in which power is restored from a power failure are assumed for each case of the daytime and the nighttime. Thus, because of the combination of the cases, there are six types of test conditions. FIG. 20 illustrates the test conditions for checking the operations of the street light. In FIG. 20, the test conditions are distinguished from each other using test numbers.

The street light 500 has an illuminance sensor. The illuminance sensor detects illuminance in the surroundings of the street light 500. When the operation test is performed, the illuminance sensor outputs a dummy signal for a daytime level in accordance with the assumption for the daytime and outputs a dummy signal for a nighttime level in accordance with the assumption for the nighttime.

The power source unit 202a has a current sensor. When the operation test is performed, the current sensor outputs a dummy signal indicating that the power system is properly supplying power, in accordance with the assumption that the power system is properly supplying power, outputs a dummy signal indicating that there is a power failure, in accordance with the assumption that there is a power failure, and outputs a dummy signal indicating that power is restored from a power failure, in accordance with the assumption that power is restored from a power failure.

In this case, the first controller 203b may transmit each dummy signal by executing the checking program. The second controller 502b may also transmit each dummy signal by executing the checking program.

The individual test conditions will be described below.

(a) Test Number 1: A Case in which the Power System is Properly Supplying Power in the Daytime In this case, the normal operation is that the lighting unit is turned off and the storage battery 201 is undischarged.

When a program for this test is executed, a dummy signal indicating that the power system is properly supplying power and a dummy signal indicating that the illuminance is at a daytime level are input to the second controller. Upon receiving the dummy signals, the second controller does not cause the operating unit (the lighting unit) to operate. The power storage apparatus does not supply power to the operating unit. At least one of the first checker and the second checker checks the power supply operation performed by the power storage apparatus and the operation of the lighting unit.

(b) Test Number 2: A Case in which there is a Power Failure in the Daytime

In this case, the normal operation is that the lighting unit is turned off and the storage battery 201 is undischarged.

When the program for this test is executed, a dummy signal indicating a power failure and a dummy signal indicating that the illuminance is at a daytime level are input to the second controller. Upon receiving the dummy signals, the second controller does not cause the operating unit (the lighting unit) to operate. The power storage apparatus does not supply power to the operating unit. At least one of the first checker and the second checker checks the power supply operation performed by the power storage apparatus and the operation of the lighting unit.

(c) Test Number 3: A Case in Power is Restored from a Power Failure in the Daytime In this case, the normal operation is that the lighting unit is off and the storage battery 201 is undischarged.

When the program for the test is executed, a dummy signal indicating that the power in the power system is restored and a dummy signal indicating that the illuminance is at a daytime level are input to the second controller. Upon receiving the dummy signals, the second controller does not cause the operating unit (the lighting unit) to operate. The power storage apparatus does not supply power to the operating unit. At least one of the first checker and the second checker checks the power supply operation performed by the power storage apparatus and the operation of the lighting unit.

(d) Test Number 4: A Case in which the Power System is Properly Supplying Power in the Nighttime In this case, the normal operation is that the lighting unit is on and the storage battery 201 is undischarged.

When the program for the test is executed, a dummy signal indicating that the power system is properly supplying power and a dummy signal indicating that the illuminance is at a nighttime level are input to the second controller. Upon receiving the dummy signals, the second controller causes the operating unit (the lighting unit) to operate. Since the power system is properly supplying power, the power storage apparatus does not supply power to the operating unit. Power is supplied from the power source unit 202a to the operating unit. At least the first checker is used to check the power supply operation performed by the power storage apparatus and the operation of the lighting unit. In some cases, the second checker may be used to check the operation of the lighting unit.

The first checker is a sensor that can check that power is supplied from the power storage apparatus, not from the power system, to the street light. Otherwise, there is a possibility that this case is confused with a case in which the street light is operating using power supplied from the power system. One example of the sensor is a current sensor for sensing electrical current output from the power storage apparatus.

(e) Test Number 5: A Case in which there is a Power Failure in the Nighttime

In this case, the normal operation is that the lighting unit is on and the storage battery 201 is discharged.

When the program for this test is executed, a dummy signal indicating that there is a power failure in the power system and a dummy signal indicating that the illuminance is at a nighttime level are input to the second controller. Upon receiving the dummy signals, the second controller causes the operating unit (the lighting unit) to operate. Since there is a power failure in the power system, the power storage apparatus supplies power to the operating unit. At least the first checker is used to check the power supply operation performed by the power storage apparatus and the operation of the lighting unit. In some cases, the second checker may be used to check the operation of the lighting unit.

(f) Test Number 6: A Case in which Power is Restored from a Power Failure in the Nighttime In this case, the normal operation is that the lighting unit is on and the storage battery 201 is undischarged.

When the program for this test is executed, a dummy signal indicating that the power in the power system is restored from a power failure and a dummy signal indicating that the illuminance is at a nighttime level are input to the second controller. Upon receiving the dummy signals, the second controller causes the operating unit (the lighting unit) to operate. Since the power system is properly supplying power, the power storage apparatus does not supply power to the operating unit. Power is supplied from the power source unit 202a to the operating unit. At least the first checker is used to check the power supply operation performed by the power storage apparatus and the operation of the lighting unit. In some cases, the second checker may be used to check the operation of the lighting unit.

Figure 21:
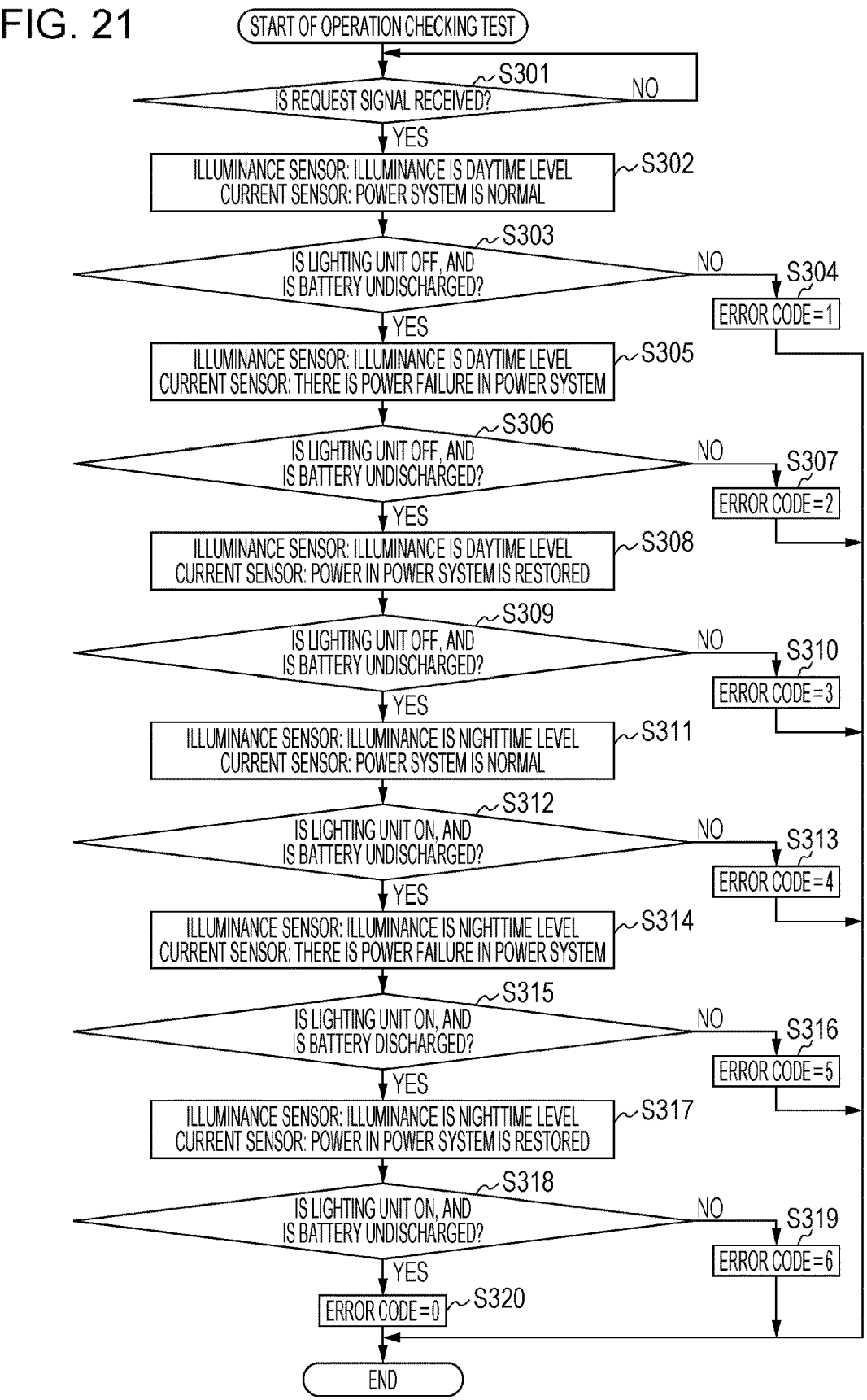
FIG. 21 is a flowchart illustrating processing of operation checking test for supplementary description.

Next, processing of the operation checking test for the electrical equipment will be described with reference to the flowchart illustrated in FIG. 21.

The first controller 203b determines whether or not the request signal is received (step S301). If the request signal is not received ("NO" in step S301), the first controller 203b returns the control to step S301 and performs the processing again.

If the request signal is received ("YES" in step S301), a dummy signal indicating that the power system is properly supplying power and a dummy signal indicating that the illuminance is at the daytime level are input to the second controller (step S302). In this case, the second controller does not cause the lighting unit to operate.

At least one of the first checker and the second checker checks whether or not the lighting unit is off and the storage battery is undischarged (step S303). If the lighting unit is on, or the storage battery is discharged ("NO" in step S303), the first controller sets "1" for an error code (step S304). Next, the processing of the operation checking test ends.

If the lighting unit is off, and the storage battery is undischarged ("YES" in step S303), a dummy signal indicating that there is a power failure in the power system and a dummy signal indicating that the illuminance is at the daytime level are input to the second controller (step S305). In this case, the second controller does not cause the lighting unit to operate.

At least one of the first checker and the second checker checks whether or not the lighting unit is off and the storage battery is undischarged (step S306). If the lighting unit is on, or the storage battery is discharged ("NO" in step S306), the first controller sets "2" for the error code (step S307). Next, the processing of the operation checking test ends.

If the lighting unit is off, and the storage battery is undischarged ("YES" in step S306), a dummy signal indicating that the power in the power system is restored and a dummy signal indicating that the illuminance is at the daytime level are input to the second controller (step S308). In this case, the second controller does not cause the lighting unit to operate.

At least one of the first checker and the second checker checks whether or not the lighting unit is off and the storage battery is undischarged (step S309). If the lighting unit is on, or the storage battery is discharged ("NO" in step S309), the first controller sets "3" for the error code (step S310). Next, the processing of the operation checking test ends.

If the lighting unit is off, and the storage battery is undischarged ("YES" in step S309), a dummy signal indicating that the power system is normal and a dummy signal indicating that the illuminance is at the nighttime level are input to the second controller (step S311). In this case, the second controller causes the lighting unit to operate.

At least the first checker checks whether or not the lighting unit is on and the storage battery is undischarged (step S312). If the lighting unit is off, or the storage battery is discharged ("NO" in step S312), the first controller sets "4" for the error code (step S313). Next, the processing of the operation checking test ends.

If the lighting unit is on, and the storage battery is undischarged ("YES" in step S312), a dummy signal indicating that there is a power failure in the power system and a dummy signal indicating that the illuminance is at the nighttime level are input to the second controller (step S314). In this case, the second controller causes the lighting unit to operate.

At least the first checker checks whether or not the lighting unit is on and the storage battery is discharged (step S315). If the lighting unit is off, or the storage battery is undischarged ("NO" in step S315), the first controller sets "5" for the error code (step S316). Next, the processing of the operation checking test ends.

If the lighting unit is on, and the storage battery is discharged ("YES" in step S315), a dummy signal indicating the power in the power system is restored and a dummy signal indicating that the illuminance is at the nighttime level are input to the second controller (step S317). In this case, the second controller causes the lighting unit to operate.

At least the first checker checks whether or not the lighting unit is on and the storage battery is undischarged (step S318). If the lighting unit is off, or the storage battery is discharged ("NO" in step S318), the first controller sets "6" for the error code (step S319). Next, the processing of the operation checking test ends.

If the lighting unit is on, and the storage battery is undischarged ("YES" in step S318), the first controller sets "0" for the error code (step S320). Next, the processing of the operation checking test ends.

In this case, if "0" is set for the error code, the operation is normal. On the other hand, if "1", "2", "3", "4", "5", or "6" is set for the error code, the operation is not normal.

Other Modifications

Although the present disclosure has been described above based on the embodiments and the modifications, the present disclosure is not limited to the above-described embodiments and modifications. The following arrangements may also be used.

(1) In the second to fourth modifications described above, the first checker included in the power storage apparatus determines whether or not the power supply from the power storage apparatus to the electrical equipment is normal. The present disclosure, however, is not limited to this example.

The electrical equipment includes the second checker, and when power is supplied from the power storage apparatus to the second controller in the electrical equipment, the second checker may determine whether or not the power supply from the power storage apparatus to the electrical equipment is normal. In this case, the second checker transmits a checking result to the first controller via the second controller, the third communicator, and the second communicator.

(2) Although a mode in which not only the state of the power supply operation performed by the power storage apparatus but also the state of the operation of the electrical equipment is checked and information indicating the states is included in the response information has been described above in the embodiments and modifications, the present disclosure is not limited to the mode. The response information may include at least one of information regarding whether or not the power supply operation performed by the power storage apparatus is normal and information regarding whether or not the operation of the electrical equipment is normal. More specifically, the response information may have a format that includes information regarding whether or not the power supply operation performed by the power storage apparatus is normal and that does not include information regarding whether or not the operation of the electrical equipment is normal. In this case, whether or not the state of the operation of the electrical equipment may or may not be checked. The request signal includes a request signal for requesting information regarding whether or not the power supply operation performed by the power storage apparatus is normal, but does not include a request signal for requesting information regarding the state of the operation of the electrical equipment. The response information may also have a format that includes information regarding whether or not the operation of the electrical equipment is normal and that does not include information regarding whether or not the power supply operation performed by the power storage apparatus is normal. In this case, checking of the power supply operation performed by the power storage apparatus is executed in addition to checking of the operation of the electrical equipment. The request signal includes a request signal for requesting information regarding the state of the operation of the electrical equipment, but does not include a request signal for requesting information regarding whether or not the power supply operation performed by the power storage apparatus is normal. As is apparent from the above-described embodiments and modifications and this example, the request signal may be any request signal for requesting at least one of information regarding whether or not the power supply operation performed by the power storage apparatus is normal and information regarding whether or not the operation of the electrical equipment is normal.

(3) Although a mode in which the power storage apparatus adds the response information (the apparatus response information) from the downstream power storage apparatus to generate response information and transmits the response information to the transmission source of the request signal has been described above in the embodiments and modifications, a mode in which the response information (the apparatus response information) of the downstream power storage apparatus is not added to the response information including the information regarding the local operation state may also be employed. In this case, the response information including the local operation state is directly transmitted to the transmission source of the request signal, and the response information of the downstream power storage apparatus is directly transmitted (transferred) to the transmission source of the request signal. The "information regarding the local operation state" in this case includes at least one of information regarding whether or not the power supply operation performed by the power storage apparatus is normal and information regarding whether or not the operation of the electrical equipment for which the power storage apparatus is provided is normal.

(4) Although a case in which the electrical equipment is a guide light or a street light has been described above in the embodiments and the modifications, this is merely an example. The electrical equipment may be any electrical equipment that operates using power supplied from a power storage apparatus. For example, the electrical equipment may be an electrically powered moving body, such as an electric bicycle, an electric wheelchair, or an electric vehicle. In this case, the operating unit is a motor. In this case, when the electrical equipment includes the second checker, the second checker may be a sensor for sensing an output of the operating unit, not a current sensor or a voltage sensor. One example of the sensor for sensing an output of the operating unit is a revolutions-per-minute (RPM) sensor for a motor.

The electrical equipment may also be medical equipment that operates using power supplied from a power storage apparatus. In this case, the operating unit is, for example, a motor or a pump, although it varies depending on the medical equipment. In this case, when the electrical equipment includes the second checker, the second checker may be a sensor for sensing an output of the operating unit, not a current sensor or a voltage sensor. Examples of the sensor for sensing an output of the operating unit include an RPM sensor for a motor and a flow rate sensor for fluid output from a pump.

(5) In the above-described embodiments and modifications, the description has been given of a case in which when the request signal for requesting information regarding whether or not the power supply operation that the power storage apparatus performs on the electrical equipment is normal is received from the external communication equipment, the response information including the information regarding the state of the power supply operation performed by the power storage apparatus and the information regarding the state of the operation of the electrical equipment are transmitted to the transmission source of the request signal.

The present disclosure, however, is not limited to this mode. More specifically, a mode may be employed in which when a request signal for requesting information regarding whether or not an operation using power supplied from the power storage apparatus for the electrical equipment is normal is received from the external communication equipment, response information including information regarding whether or not the operation using power supplied from the power storage apparatus for the electrical equipment is normal is transmitted to the transmission source of the request signal via the first communicator. In this case, the request signal is transmitted to another power storage apparatus via the first communicator. As in the above-described embodiments and modifications, the first controller causes the checker provided in the power storage apparatus and the checker provided in the electrical equipment to check whether or not an operation using power supplied from the power storage apparatus for the electrical equipment is normal. Based on checking results of the checkers, the first controller generates response information including information regarding whether or not the operation using power supplied from the power storage apparatus for the electrical equipment is normal.

When the request signal is received, the information regarding the state of the power supply from the power storage apparatus to the electrical equipment may or may not be added to the response information.

The technology disclosed hereinabove is useful when a plurality of pieces of electrical equipment are arranged in the communication range of a short-range wireless communicator in a power storage apparatus.

(6) A first mode of the present disclosure provides a power storage apparatus provided for electrical equipment. The power storage apparatus includes: a storage battery; a power supply circuit that supply power of the storage battery to the electrical equipment; a first communicator that communicates with external communication equipment through a short-range wireless communication; and control circuitry that causes, when the first communicator receives a request signal for requesting at least one of first information regarding whether or not a power supply operation to supply the power of the storage battery to the electrical equipment through the power supply circuit is normal and second information regarding whether or not an operation of the electrical equipment using power supplied from the storage battery is normal from the external communication equipment, the first communicator to transmit response information including at least one of the first information and the second information to a transmission source of the request signal and to transmit the request signal to another power storage apparatus.

In the first mode, a second mode of the present disclosure provides a power storage apparatus that may further include: a checker that checks whether or not the power supply operation is normal. When the first communicator receives the request signal for requesting the first information, the control circuitry may cause the checker to check whether or not the power supply operation is normal and may generate response information including the first information by using a result of the checking performed by the checker.

In the first or second mode, a third mode of the present disclosure provides a power storage apparatus in which, when the first communicator receives the request signal for requesting the second information, the control circuitry may cause at least one of a checker included in the power storage apparatus and a checker included in the electrical equipment to check whether or not an operation of the electrical equipment using power supplied from the storage battery is normal and may generate response information including the first information by using a result of the checking performed by the at least one checker.

In one of the first to third modes, a fourth mode of the present disclosure provides a power storage apparatus in which, when the first communicator receives, from the other power storage apparatus, response information to the request signal transmitted to the other power storage apparatus, the control circuitry may further cause the first communicator to transmit the response information of the other power storage apparatus to the transmission source of the request signal.

In one of the first to third modes, a fifth mode of the present disclosure provides a power storage apparatus in which, when the first communicator receives, from the other power storage apparatus, response information to the request signal transmitted to the other power storage apparatus, the control circuitry may add at least one of the first information and the second information of the other power storage apparatus to the response information of the power storage apparatus, the first information and the second information being included in the response information of the other power storage apparatus.

In this case, the first information of the other power storage apparatus means first information regarding whether or not a power supply operation that the other power storage apparatus performs on electrical equipment is normal, and the second information of the other power storage apparatus means second information regarding whether or not an operation of electrical equipment using power supplied from the other power storage apparatus is normal.

In one of the first to fifth modes, a sixth mode of the present disclosure provides a power storage apparatus in which the external communication equipment may include an information terminal.

In one of the first to fifth modes, a seventh mode of the present disclosure provides a power storage apparatus in which the external communication equipment may include another power storage apparatus provided at an upstream side in a direction in which the request signal is transmitted.

In one of the first to seventh modes, an eighth mode of the present disclosure provides a power storage apparatus that further includes a second communicator that communicates with the electrical equipment. When the first communicator receives, from the external communication equipment, the request signal for requesting the first information, the control circuitry may output the request signal for requesting the second information to the electrical equipment via the second communicator.

In the eighth mode, a ninth mode of the present disclosure provides a power storage apparatus in which the control circuitry may add, to the response information, the second information received from the second communicator.

In one of the first, third to ninth modes, a tenth mode of the present disclosure provides a power storage apparatus that further includes a second communicator that communicates with the electrical equipment. When the first communicator receives, from the external communication equipment, the request signal for requesting the first information, the control circuitry may further transmit an instruction for checking whether or not the power supply operation is normal to the electrical equipment via the second communicator, and may add the first information to the response information of the power storage apparatus, the first information being generated using a result of the checking performed for the electrical equipment.

An 11th mode of the present disclosure provides a method for controlling a power storage apparatus provided for electrical equipment. The method includes: supplying power of the storage battery included in the power storage apparatus to the electrical equipment through a power supply circuit included in the power storage apparatus; receiving, by a first communicator provided in the power storage apparatus to communicate with external communication equipment through a short-range wireless communication, a request signal for requesting at least one of first information regarding whether or not a power supply operation to supply the power of the storage battery to the electrical equipment is normal through the power supply circuit and second information regarding whether or not an operation of the electrical equipment using power supplied from the storage battery is normal from the external communication equipment; and causing the first communicator to transmit response information including at least one of the first information and the second information to a transmission source of the request signal and to transmit the request signal to another power storage apparatus.

A 12th mode of the present disclosure provides a method for controlling an information terminal that is external communication equipment that is capable of performing communication with a power storage apparatus. The method includes: transmitting, to the power storage apparatus, a request signal for requesting at least one of first information regarding whether or not a power supply operation to supply power of a storage battery included in the power storage apparatus to the electrical equipment through a power supply circuit included in the power storage apparatus is normal and second information regarding whether or not an operation of the electrical equipment using power supplied from the storage battery is normal; obtaining response information including at least one of the first information and the second information, the response information being transmitted by the power storage apparatus in response to the request signal; and displaying the information regarding whether or not the power supply operation is normal, the information being included in the obtained response information, on a display screen of the information terminal.

In the 12th mode, a 13th mode of the present disclosure provides a method for controlling a power storage apparatus provided for electrical equipment and including a storage battery. The method includes: receiving, by a first communicator provided in the power storage apparatus to communicate with external communication equipment through a short-range wireless communication, a request signal for requesting at least one of first information regarding whether or not a power supply operation that the power storage apparatus performs on the electrical equipment is normal and second information regarding whether or not an operation of the electrical equipment using power supplied from the power storage apparatus is normal from the external communication equipment; and causing the first communicator to transmit response information including at least one of the first information and the second information to a transmission source of the request signal and to transmit the request signal to another power storage apparatus.

In this case, the first information of the plurality of power storage apparatuses means first information regarding whether or not a power supply operation that each of the power storage apparatuses performs on electrical equipment is normal, and the second information of the other power storage apparatus means second information regarding whether or not an operation of electrical equipment using power supplied from each of the power storage apparatuses is normal.

(7) As described above, each apparatus is a computer system having a microprocessor and a memory. The memory may store a computer program, and the microprocessor may operate in accordance with the computer program. The computer program in this case is made of a combination of a plurality of instruction codes for giving instructions to a computer in order to achieve a predetermined function.

The computer program may also be recorded on computer-readable recording media, for example, a flexible disk, a hard disk, a compact disc read-only memory (CD-ROM), a magneto-optical (MO) disc, a digital versatile disk (DVD), a DVD-ROM, a DVD-RAM, a Blu-ray disc, and a semiconductor memory.

The computer program may be transmitted over a telecommunication channel, a wireless or wired communication channel, a network typified by the Internet, data broadcasting, or the like.

The computer program may also be executed by another independent computer system by transporting the recording medium on which the computer program is recorded or transferring the computer program over a network or the like.

(8) The above-described embodiments and modifications may also be combined together.

The power storage apparatus in the present disclosure is provided for electrical equipment and can check the state of power supply from the power storage apparatus to the electrical equipment. Accordingly, the present disclosure is applicable to a technology for notifying a user of the state of power supply from a power storage apparatus to electrical equipment.

What is claimed is:

1. A power storage apparatus provided for electrical equipment, the power storage apparatus comprising:
    a storage battery;
    a power supply circuit that supplies power of the storage battery to the electrical equipment;
    a first communicator that communicates with external communication equipment through a short-range wireless communication; and
    control circuitry that causes,
    when the first communicator receives, from the external communication equipment, a request signal for requesting at least one of first information regarding whether or not a power supply operation to supply the power of the storage battery to the electrical equipment through the power supply circuit is normal, and second information regarding whether or not an operation of the electrical equipment using the power supplied from the storage battery is normal,
    the first communicator to transmit response information including at least one of the first information and the second information to a transmission source of the request signal and to transmit the request signal to another power storage apparatus,
    wherein the first communicator and the control circuitry are provided in the power storage apparatus.

2. The power storage apparatus according to claim 1, further comprising:
    a checker that checks whether or not the power supply operation is normal,
    wherein, when the first communicator receives the request signal for requesting the first information, the control circuitry causes the checker to check whether or not the power supply operation is normal and generates response information including the first information by using a result of the check performed by the checker.

3. The power storage apparatus according to claim 1, wherein, when the first communicator receives the request signal for requesting the second information, the control circuitry causes at least one of a checker included in the power storage apparatus and a checker included in the electrical equipment to check whether or not an operation of the electrical equipment using the power supplied from the storage battery is normal and generates response information including the first information by using a result of the check performed by the at least one of the checker included in the power storage apparatus and the checker included in the electrical equipment.

4. The power storage apparatus according to claim 1, wherein, when the first communicator receives, from the other power storage apparatus, response information to the request signal transmitted to the other power storage apparatus, the control circuitry further causes the first communicator to transmit the response information of the other power storage apparatus to the transmission source of the request signal.

5. The power storage apparatus according to claim 1, wherein, when the first communicator receives, from the other power storage apparatus, response information to the request signal transmitted to the other power storage apparatus, the control circuitry adds at least one of first information and second information of the other power storage apparatus to the response information of the power storage apparatus, the first information and the second information of the other power storage apparatus being included in the response information of the other power storage apparatus.

6. The power storage apparatus according to claim 1, wherein the external communication equipment comprises an information terminal.

7. The power storage apparatus according to claim 1, wherein the external communication equipment comprises another power storage apparatus provided at an upstream side in a direction in which the request signal is transmitted.

8. The power storage apparatus according to claim 1, further comprising:
a second communicator that communicates with the electrical equipment,
wherein, when the first communicator receives, from the external communication equipment, the request signal for requesting the first information, the control circuitry outputs the request signal for requesting the second information to the electrical equipment via the second communicator.

9. The power storage apparatus according to claim 8, wherein the control circuitry adds, to the response information, the second information received from the second communicator.

10. The power storage apparatus according to claim 1, further comprising:
a second communicator that communicates with the electrical equipment,
wherein, when the first communicator receives, from the external communication equipment, the request signal for requesting the first information, the control circuitry further transmits an instruction for checking whether or not the power supply operation is normal to the electrical equipment via the second communicator, and
adds the first information to the response information of the power storage apparatus, the first information being generated using a result of the checking performed for the electrical equipment.

11. The power storage apparatus according to claim 1, wherein the control circuitry receives, in response to the request signal transmitted to the other power storage apparatus by the control circuitry, and
at least one of first information and second information corresponding to the other power storage apparatus.

12. The power storage apparatus according to claim 11, wherein the control circuitry further receives, from the other power storage apparatus, in response to the request signal transmitted to the other power storage apparatus by the control circuitry, and
at least one of first information and second information corresponding to one or more additional power storage apparatuses that communicate with the other power storage apparatus.

13. A method for controlling a power storage apparatus provided for electrical equipment, the method comprising:
supplying power of the storage battery included in the power storage apparatus to the electrical equipment through a power supply circuit included in the power storage apparatus;
receiving, from external communication equipment by a communicator provided in the power storage apparatus to communicate with the external communication equipment through a short-range wireless communication, a request signal for requesting at least one of first information regarding whether or not a power supply operation to supply the power of the storage battery to the electrical equipment through the power supply circuit is normal and second information regarding whether or not an operation of the electrical equipment using the power supplied from the storage battery is normal; and
causing, by control circuitry, the communicator to transmit response information including at least one of the first information and the second information to a transmission source of the request signal and to transmit the request signal to another power storage apparatus,
wherein the communicator and the control circuitry are provided in the power storage apparatus.

14. A method for controlling an information terminal that is an external communication equipment that is configured to perform communication with a power storage apparatus, the method comprising:
transmitting, to the power storage apparatus, a request signal for requesting at least one of first information regarding whether or not a power supply operation to supply power of a storage battery included in the power storage apparatus to the electrical equipment through a power supply circuit included in the power storage apparatus is normal and second information regarding whether or not an operation of the electrical equipment using the power supplied from the storage battery is normal;
obtaining response information including at least one of the first information and the second information, the response information being transmitted by the power storage apparatus in response to the request signal; and displaying power supply operation information regarding whether or not the power supply operation is normal, the power supply operation information being included in the obtained response information, on a display screen of the information terminal.

15. The method according to claim 14,
wherein the response information includes at least one of the first information and the second information of a plurality of power storage apparatuses; and
in the displaying of the power supply operation information, at least one of the first information and the second information of the plurality of power storage apparatuses is displayed in a tabular form on the display screen of the information terminal.

* * * * *